United States Patent [19]
Kao et al.

[11] Patent Number: 6,084,917
[45] Date of Patent: Jul. 4, 2000

[54] CIRCUIT FOR CONFIGURING AND DYNAMICALLY ADAPTING DATA AND ENERGY PARAMETERS IN A MULTI-CHANNEL COMMUNICATIONS SYSTEM

[75] Inventors: Chiihsin Kao, Palo Alto; Chunta Chen, Freemont; Ming-Kang Liu, Cupertino, all of Calif.

[73] Assignee: Integrated Telecom Express, Santa Clara, Calif.

[21] Appl. No.: 08/991,810

[22] Filed: Dec. 16, 1997

[51] Int. Cl.$^7$ .............................. H04K 1/10; H04L 27/28
[52] U.S. Cl. .......................... 375/260; 375/225; 375/222; 375/219
[58] Field of Search .................................... 375/260, 295, 375/219, 222, 225; 379/93.08; 370/235, 231

[56] References Cited

U.S. PATENT DOCUMENTS

| | | | |
|---|---|---|---|
| 4,535,472 | 8/1985 | Tomcik | 381/31 |
| 4,731,816 | 3/1988 | Hughes-Hartogs | 379/98 |
| 4,756,007 | 7/1988 | Qureshi et al. | 375/37 |
| 4,757,495 | 7/1988 | Decker et al. | 370/76 |
| 4,802,189 | 1/1989 | Wedler | 375/37 |
| 4,899,384 | 2/1990 | Crouse et al. | 381/31 |
| 4,980,897 | 12/1990 | Decker et al. | 375/38 |
| 5,023,869 | 6/1991 | Grover et al. | 370/84 |
| 5,198,818 | 3/1993 | Samueli et al. | 341/144 |
| 5,231,649 | 7/1993 | Duncanson | 375/260 |
| 5,243,629 | 9/1993 | Wei | 375/59 |
| 5,282,019 | 1/1994 | Basile et al. | 358/12 |

(List continued on next page.)

FOREIGN PATENT DOCUMENTS

| | | |
|---|---|---|
| 090598 | 3/1999 | European Pat. Off. . |
| 9857472 | 12/1998 | WIPO . |
| 9916224 | 4/1999 | WIPO . |
| 9930465 | 6/1999 | WIPO . |

OTHER PUBLICATIONS

Rupert Baines, "ADSL Community Faces Line Code Challenge," *Electronic News*, May 5, 1997, p. 48.
Pini Losowick, "VDSL Gains As Technology Barriers Fall," *Electronic News*, May 5, 1997, p. 52.
Stefan Knight, "ADSL On Fast Track To Revolutionize Work World," *Electronic News*, May 5, pp. 43 and 46.
Uwe Hering, "Market To Support Several Implementations of xDSL," *Electronic News*, May 5, pp. 56 and 73.

(List continued on next page.)

*Primary Examiner*—Stephen Chin
*Assistant Examiner*—Muhammad Ghayour
*Attorney, Agent, or Firm*—Law +

[57] ABSTRACT

A circuit for optimizing and adapting the bit and energy configurations of data sub-channels in a multi-channel data transmission signal is disclosed. The circuit preferably includes a high speed memory coupled to a digital signal processor running an executable routine for analyzing sub-channel signal-to-noise characteristics, determining theoretical bit capacity loadings, evaluating power performance margins, and optimizing initial and adaptive sub-channel configurations based on a series of iterative calculations intended to maximize the overall system power performance margin for any given target data rate. The circuit keeps track of the number of non-zero bit sub-channels ($N_{CH}$) from iteration to iteration, which results in a more accurate loading of the sub-channels. If adjustments to bit loadings are required to achieve a particular initial target rate, the circuit first adjusts those sub-channels which will have the least effect on the overall system performance margin, so that compliance with system requirements is better achieved. In addition, an "iteration criteria" count can be incorporated to ensure that the initialization or adaptation of sub-channel loadings can be effectuated (at least to a very close order) in a predetermined and controlled fashion. The resulting bit/energy loadings can be adjusted to be fully compliant with applicable Discrete Multi-Tone (DMT) implementations of Asymmetric Digital Subscriber Loop (ADSL) protocols.

47 Claims, 10 Drawing Sheets

U.S. PATENT DOCUMENTS

| | | | |
|---|---|---|---|
| 5,305,352 | 4/1994 | Calderbank et al. | 375/39 |
| 5,313,467 | 5/1994 | Varghese et al. | 370/94 |
| 5,321,725 | 6/1994 | Paik et al. | 375/39 |
| 5,400,322 | 3/1995 | Hunt et al. | 370/19 |
| 5,469,502 | 11/1995 | Matsumoto | 379/230 |
| 5,479,447 | 12/1995 | Chow et al. | 375/260 |
| 5,515,368 | 5/1996 | Saito et al. | 370/61 |
| 5,519,731 | 5/1996 | Cioffi | 375/260 |
| 5,521,906 | 5/1996 | Grube et al. | 370/17 |
| 5,619,492 | 4/1997 | Press et al. | 370/441 |
| 5,623,513 | 4/1997 | Chow et al. | 375/219 |
| 5,644,573 | 7/1997 | Bingham et al. | 370/503 |
| 5,715,280 | 2/1998 | Sandberg et al. | 375/260 |
| 5,790,550 | 8/1998 | Peeters et al. | 370/480 |
| 5,812,599 | 9/1998 | Van Kerckhove | 375/260 |
| 5,822,372 | 10/1998 | Emami | 375/260 |
| 5,822,374 | 10/1998 | Levin | 375/260 |
| 5,832,387 | 11/1998 | Bae et al. | 455/522 |
| 5,852,633 | 12/1998 | Levin et al. | 375/200 |
| 5,903,608 | 5/1999 | Chun | 375/260 |
| 5,982,813 | 11/1999 | Dutta et al. | 375/219 |

OTHER PUBLICATIONS

Peter S. Chow, et al, "A Practical Discrete Transceiver Loading Algorithm for Data Transmission over Spectrally Shaped Channel," *IEEE Transactions on Communications*, vol. 43, No. 2/3/4, Feb./Mar./Apr., 1995, pp. 773–775.

Peter Kraniauskas, "A Plain Man's Guide to the FFT," *IEEE Signal Processing Magazine*, Apr. 1994, pp. 24–35.

Antonio Ruiz et al. "Discrete Multiple Tone Modulation with Coset Coding for the Spectrally Shaped Channel," *IEEE Transactions on Communications*, vol. 40, No. 6, Jun. 1992, pp. 1012–1029.

John M. Cioffi, "A Multicarrier Primer," ANSI Contribution TIE14/91–1578, Deerfield Beach, Florida, Nov. 1991.

Jacky S. Chow et al. "A Discrete Multitone Transceiver System for HDSL Applications," *IEEE Journal on Selected Areas in Communications*, vol. 9, No. 6, Aug. 1991, pp. 895–908.

Peter S. Chow et al., "Performance Evaluation of a Multichannel Transceiver System for ADSL and VHDSL Services," *IEEE Journal on Selected Areas in Communications*, vol. 9, No. 6, Aug. 1991.

John A.C. Bingham, "Multicarrier Modulation for Data Transmission: An Idea Whose Time Has Come," *IEEE Communications Magazine*, vol. 28, No. 5, May 1990, pp. 5–14.

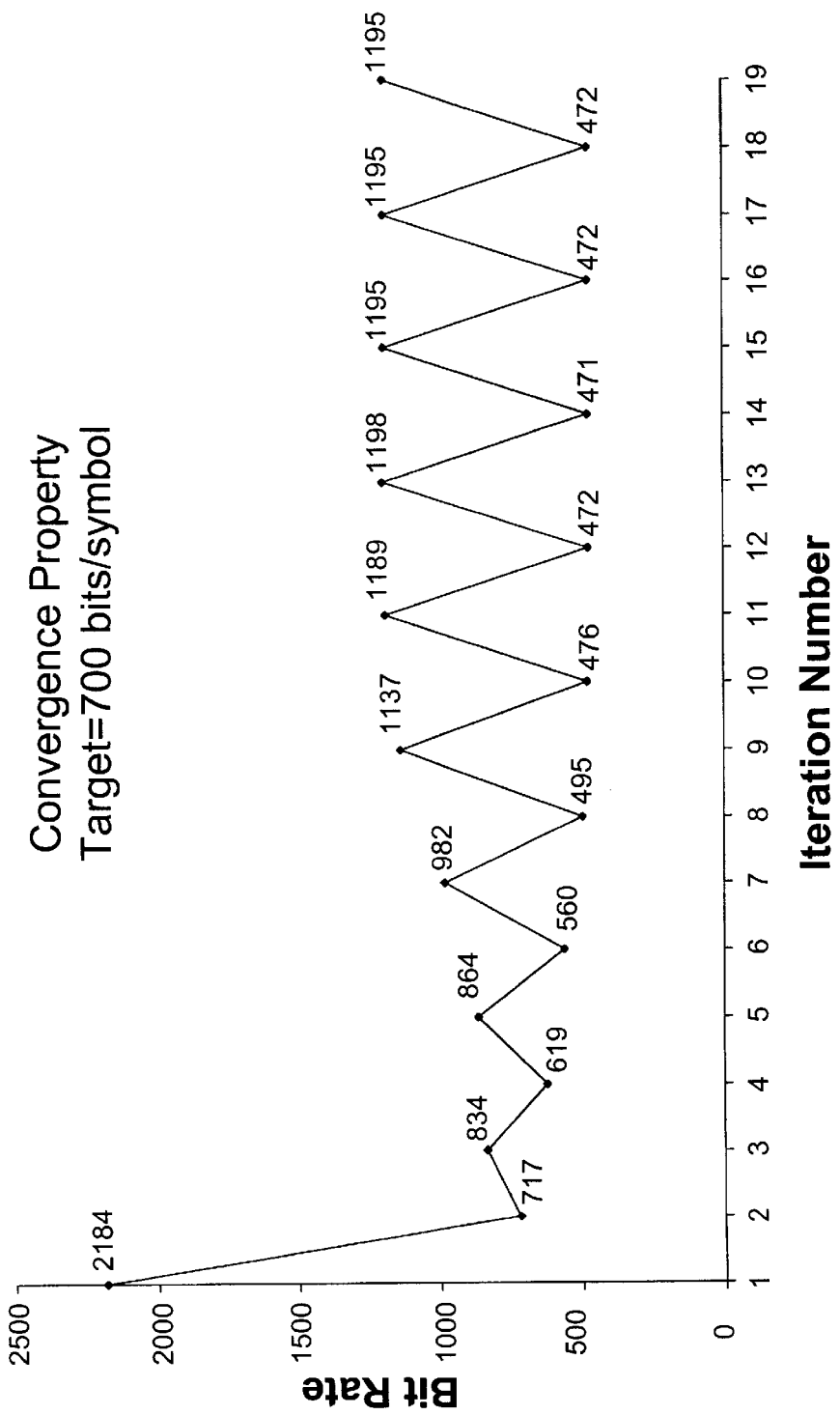

Solid Lines: power margin during iteration
Dotted Lines: interval limits during binary iteration Solid Lines: power margin during iteration
Dotted Lines: interval limits during binary iteration

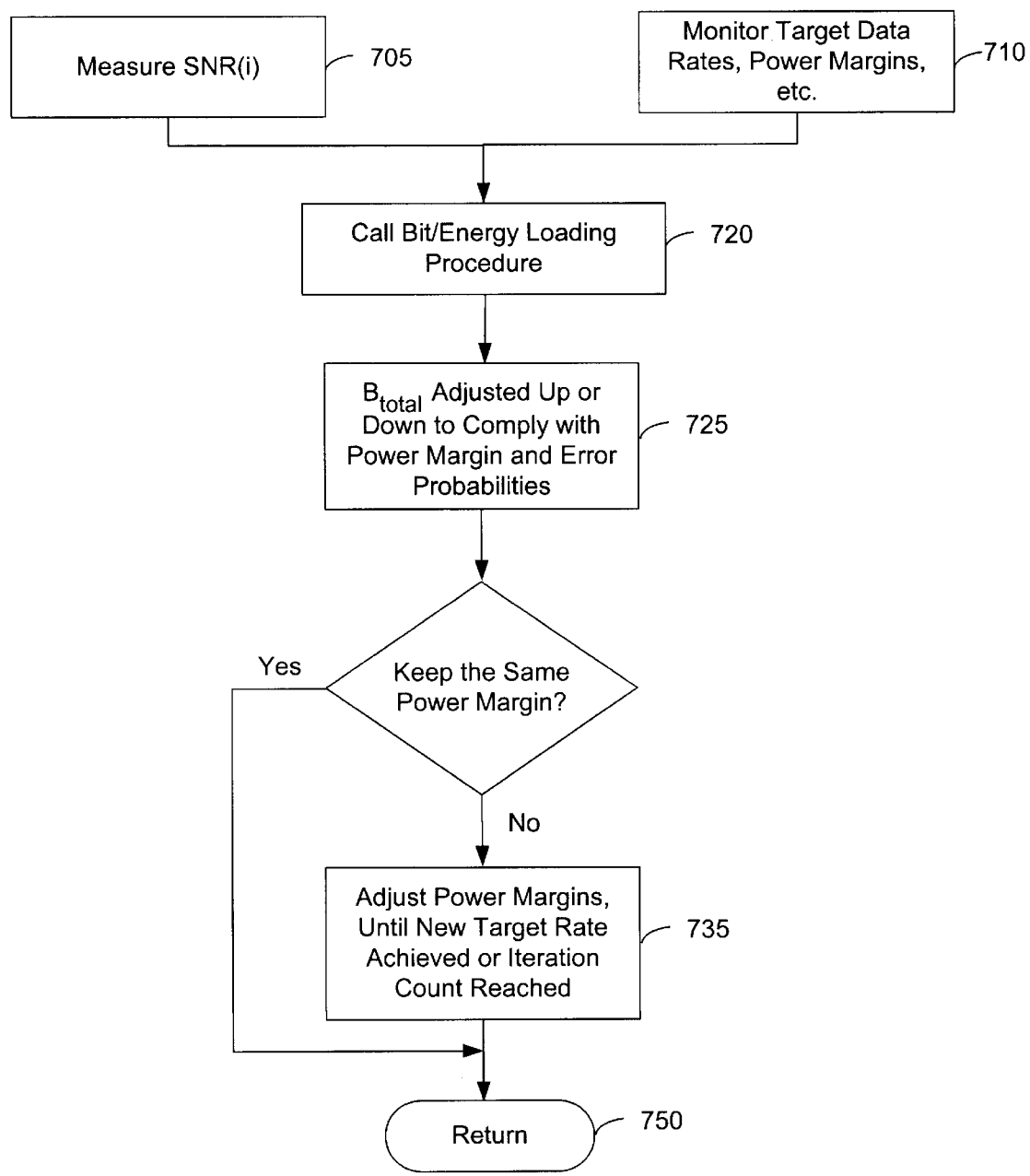

CIRCUIT FOR CONFIGURING AND DYNAMICALLY ADAPTING DATA AND ENERGY PARAMETERS IN A MULTI-CHANNEL COMMUNICATIONS SYSTEM

CROSS REFERENCE TO RELATED APPLICATIONS

The present application is related to the following additional applications, all of which are being filed concurrently herewith:

Application Ser. No. 08/991,444 filed Dec. 16, 1997 entitled "Circuit For Configuring Data and Energy Parameters in a Multi-Channel Communications System."

Application Ser. No. 08/991,453, filed Dec. 16, 1997 entitled "Method For Configuring Data and Energy Parameters in a Multi-Channel Communications System."

Application Ser. No. 08/991,449, filed Dec. 16, 1997 entitled "Method of Configuring and Dynamically Adapting Data and Energy Parameters in a Multi-Channel Communications System."

Application Ser. No. 08/991,998 filed Dec. 17, 1997 entitled "ADSL Transceiver Implemented With Associated Bit and Energy Loading Integrated Circuit."

FIELD OF THE INVENTION

The invention relates generally to a high-speed rate adaptive communications system which utilizes an improved combination of bit/energy initializations and bit fine tunings effected on a data transmission signal consisting of a multitude of sub-channels. The present invention has specific applicability to Asymmetric Digital Subscriber Loops (ADSL) and similar environments.

BACKGROUND OF THE INVENTION

Remote access and retrieval of data and information are becoming more desirable and common in both consumer and business environments. As data and information transfer is becoming more and more voluminous and complex, using traditional data links such as voice-band modems is too slow in speed. For example, the use of the Internet to locate and access information is increasing daily, but the retrieval of typical graphics, video, audio, and other complex data forms is generally unsatisfactorily slow using conventional voice-band modems. In fact, the slow rate of existing dial-up analog modems frustrates users, and commerce and interaction using the Internet would have been even higher were it not for the unacceptable delays associated with present day access technology. The ability to provide such desired services as video on demand, television (including HDTV), video catalogs, remote CD-ROM's, high-speed LAN access, electronic library viewing, etc., are similarly impeded by the lack of high speed connections.

Since copper lines are widely available and developed, solutions to the high speed access problem have been focused on improving the performance of voice-band modems, which operate at the subscriber premises end over a 3 kHz voice band and transmit signals through the public switching telephone network (PSTN). The phone company network treats them exactly like voice signals. These modems presently transmit up to 33.6 kb/s over 2-wire telephone line, even though the practical speed was 1.2 kb/s only twenty years ago. The improvement in voice band-modems over the past years has resulted from significant advances in algorithms, digital signal processing, and semiconductor technology. Because such modems are limited to voice bandwidth (3.0 kHz), the rate is bound by the Shannon limit, around 30 kb/s. A V.34 modem, for example, achieves 10 bits/Hz, a figure that approaches the theoretical Shannon limits. There is a considerable amount of bandwidth available in copper lines, however, that has gone unused by voice-band modems, and this is why a proposal known as Asymmetric Digital Subscriber Loop (ADSL) was suggested in the industry as a high-speed protocol/connection alternative. The practical limits on data rate in conventional telephone line lengths (of 24 gauge twisted pair) vary from 1.544 Mb/s for an 18,000 foot connection, to 51.840 Mb/s for a 1,000 foot connection. Since a large proportion of current telephone subscribers fall within the 18,000 foot coverage range, ADSL can make the current copper wire act like a much "bigger pipe" for sending computer bits and digital information (like movies and TV channels), while still carrying the voice traffic. For example, an ADSL modem can carry information 200 times faster than the typical voice band modem used today.

ADSL is "asymmetric" in that more data goes downstream (to the subscriber) than upstream (back from the subscriber). The reason for this is a combination of cost, cross-talk, speed demands, and performance. For example, twisted pair wiring coupling increases with the frequency of the signal. If symmetric signals in many pairs are used within a cable, the data rate and line lengths become significantly limited by the coupling noise. Since the preponderance of target applications for digital subscriber services is asymmetric, asymmetric bit rate is not perceived to be a serious limitation at this time. Therefore, the ADSL standard proposes up to 6 Mb/s for downstream, and up to 640 kb/s for upstream. For example, video on demand, home shopping, Internet access, remote LAN access, multimedia access, and specialized PC services all feature high data rate demands downstream, to the subscriber, but relatively low data rates demands upstream. The principal advantage is that all of the high speed data operations take place in a frequency band above the voice band, leaving Plain Old Telephone Service (POTS) service independent and undisturbed, even if an ADSL modem fails. ADSL further provides an economical solution for transmission of high bandwidth information over existing copper line infrastructures.

Specifically, the T1E1.413 ADSL standard divides the available transmission bandwidth into two parts. At the lower 4 kHz band, ordinary (POTS) is provided. The bulk of the rest bandwidth in the range from 4 kHz to about 1 MHz is for data transmission in the downstream direction, which is defined to be from the exchange to the subscriber. The upstream control channel uses a 160 kHz band in between. The signals in each channel can be extracted with an appropriate band-pass filter.

According to the T1E1.413 ADSL standard, a line code scheme called Discrete Multi-Tone (DMT) is used, which divides the spectrum from 4 kHz to 1.1 MHz into 255 4.3125 kHz channels. Each channel uses Quadrature Amplitude Modulation (QAM) to carry 2 to 15 bits/QAM symbol. This results essentially in overall performance which is equivalent to around two hundred V.34 modems used in parallel on the same line. Because each channel can be configured to a different bit rate according to the channel characteristics, it can be seen that DMT is inherently "rate-adaptive" and extremely flexible for interfacing with different subscriber equipment and line conditions. In typical DMT implementations, such as shown in U.S. Pat. No. 5,479,447 to Chow et. al., transmission power to the individual channels is initially configured based on the noise power and transmission loss in each band. In this way, channels with less noise and attenuation can carry larger amounts of data, while poorer sub-channels can be configured to carry fewer bits and can even be shut down entirely. U.S. Pat. No. 5,596,604 to Cioffi et. al. shows that it is known to store relevant information for each DMT channel in a so called Bit & Energy Table. It is further known (U.S. Pat. No. 5,400,322 to Hunt et. al.) that line conditions can vary after initialization because of temperature fluctuations, interference, etc., and this can affect both the error rate and maximum data throughput. By measuring the quality of each sub-channel on an ongoing basis, an "updated" Bit & Energy Table is maintained to adaptively configure the system for maximum data throughput or error performance. In normal applications, if the quality of any particular channel degrades to the point where the error performance of the system is compromised, one or more bits on that sub-channel are automatically moved to a sub-channel that can support additional bits.

To maximize the overall bit rate from the given channel characteristics and to achieve the target bit error rate (BER), a DMT codec needs to determine the number of bits for each QAM channel and allocate the output power within the standard's output power spectrum requirements. Since the channel characteristics may vary as a function of time, the results of this bit allocation and power allocation process need to be updated constantly. The process of determining and dynamically adapting the optimal bit capacity output power for each sub-channel is generally referred to in the art as bit/energy loading and bit fine tuning respectively.

A good combined energy loading and bit fine tuning algorithm can optimize the system performance, as measured by considerations such as the overall data throughput rate, power margin, bit-error rate, and compliance with the T1E1.413 ADSL standard. Since there is a complex and nonlinear dependence between the power margin, bit allocation, and energy loading for each sub-channel, the computation may not necessarily converge. Therefore, it is critical for the energy loading and bit-fine tuning to rapidly converge and achieve the optimum bit allocation (i.e. maximum power margin) at the given target bit rate. Furthermore, the computation should be simple to minimize the computation time or hardware requirements.

The primary problem of the energy loading and bit allocation is explained below. First, at the given channel characteristic (i.e. channel transfer function and noise spectrum density), power margin, and bit error rate, the number of bits that can be used in QAM modulation is well known in the art and can be expressed as:

$$b_i = \log_2\left(1 + \frac{E_i |H_i|^2}{\gamma_m \gamma_b N_i}\right) \quad \text{Equation (1)}$$

where $E_i$ is the energy (power/Hz) allocated to sub-channel i, $H_i$ is the value of the transfer function at the center frequency of sub-channel i, $\gamma_m$ is the power margin, $\gamma_b$ is the power gap required to achieve the specified bit error rate (e.g. 9.8 dB for BER of $10^{-7}$ in the theoretical limit), and $N_i$ is the noise power spectrum density at the center frequency of sub-channel i. Since $b_i$ in practice needs to be an integer, the T1E1.413 standard permits a ±3 dB variation of the output energy $E_i$ with respect to −40 dBm/Hz. From the above equation, the energy loading algorithm and bit allocation problem is to find a set of $E_i$ within the T1E1.413 requirements that can maximize the power margin $\gamma_m$ and at the same time achieve the target bit rate $$\left(\text{i.e.} \sum_i b_i = B_{target}\right).$$

A variety of bit and energy loading methods are known in the art. These include generally the following: (A) a system devised by Hughes-Hartogs, and described in U.S. Pat. No. 4,731,816. In this scheme, bit loading is performed incrementally, i.e., one bit at a time, until the desired bit rate is achieved. Each new bit is added to the sub-channel that requires the least amount of incremental power to sustain such bit. This algorithm was developed primarily for voice-grade modems, however, and because of its computationally complexity is not well suited for ADSL applications. Because this algorithm also inherently requires an integer number of bits, it is difficult and inefficient to extend its use to other environments that do not require bit granularity, such as Trellis coding. In addition, this algorithm requires a large amount of hardware memory space for the various power matrices associated with the sub-channel bit allocations, which makes this approach undesirable for this reason as well. (B) a "water pouring" method which basically inverts the SNR curve for the channel, and then "pours" bits into each sub-channel. At a given total output power, this method allocates equal energy for each sub-channel. The difference between the output energy and the inverted SNR in dB gives the number of bits that can be sent as can be seen from Equation (1). Although this algorithm yields the optimum theoretical performance, it is not applicable in practice. One simple reason is the bits allocated for each channel may not be integer and may not fall into the range from 2 to 15 as specified by the T1E1.413 standard. (C) an "iterative" method which updates the power margin and bit allocation alternatively. A particular implementation of the iterative approach is described in "A Practical Discrete Multi-tone Transceiver Loading Algorithm for Data Transmission over Spectrally Shaped Channels," by Peter S. Chow et. al., appearing in *IEEE Transactions on Communications*, pp. 773–775, v.43, nos. 2, 3, 4 (February/March/April 1995) (hereinafter "Chow article"). It is generally perceived in the art that the iterative approach provides the most promise for achieving the greatest overall system performance for ADSL.

The *Chow* article, which is incorporated by reference herein, sets out a bit and energy loading algorithm based on the power for each sub-channel. In general terms, the *Chow* article algorithm first starts off by assuming an initial power margin of zero dB, i.e., that each sub-channel can be filled to its maximum capacity. It then computes the bit capacity ($b_i$) for each sub-channel based on the observed signal to noise ratio, and the system performance margin. These respective capacities are rounded off as explained above to create integer based bit capacities designated ROUND($b_i$). The individual integer sub-channel bit capacities ROUND ($b_i$), as well as the rounding differences (i.e., ROUND[$b_i$]−$b_i$) are stored in arrays. Then, a simple summation is done over the individual sub-channel capacities (ROUND[$b_i$]) to determine the total bits per multi-tone symbol, $B_{total}$. The current system performance margin for each channel, $\gamma_{m,current}$ (dB), is re-computed based on the previous system performance margin, $\gamma_{m,previous}$ (in dB and is initially zero) according to $$\gamma_{m,current} = \gamma_{m,previous} + 10 \times \log_{10}(2^{(B_{total}-B_{target})/N_{ch}})$$

where $B_{total}$ the is actual total bits per multi-tone symbol, $B_{target}$ is the desired target bits per multi-tone symbol, and $N_{ch}$ is the number of channels used.

The power margin is then used to re-calibrate the sub-channel bit capacities, and the whole process repeats (iterates) until a steady state solution is achieved that meets the necessary system performance margin and bit target rates. While this scheme works well in many applications, we have discovered that it suffers from a number of drawbacks, including the fact that for many real-world line environments, the above algorithm fails to "converge"; in other words, despite repeated iterations, the new calculated system performance margin and overall bit rate throughput deviate from the targeted rates. This is illustrated in FIG. 1A. In fact, in many situations, the algorithm causes the system performance margin and bit throughput variations to increase, rather than decrease, with each iteration. This phenomenon, which has been verified experimentally using simulation software known as MATLAB, is depicted generally in FIG. 1A. As can be seen there, for a typical ADSL application where the targeted bits per multi-tone symbol is 1000 bits/symbol, the actual bits achieved deviates significantly from iteration to iteration, and in fact becomes worse as the process continues. FIG. 1B shows that for a smaller target bits of 700 bits/symbol, the prior art algorithm fails to even come close, and at iteration No. 19 it deviates by more than 70% (1195 versus , 700) from the required targeted rate. These deviations from the targeted bit rate are obviously highly undesirable, as they compromise system integrity, and cause significant system performance degradation. Moreover, as seen in FIG. 1C, this process does not converge after a large number of iterations, as it supposed to do, and consequently the continuing computations waste valuable system resources. Consequently, the prior art cannot achieve a solution that is satisfactory across all potential operating conditions.

Even though the energy loading and bit allocation can be optimally done at the beginning of the call setup (or during an initialization process for an always on connection) there are nevertheless occasions and circumstances that may call for power margin and/or overall data rate updates to maintain optimum system performance. The occasions and circumstances include the changes of the overall channel characteristics and the required target bit rate. For this reason, it is also known in the art that a bit "fine tuning" process is needed to adapt the system performance over a wider operating range.

The prior art bit fine tuning processes described in the literature to date are adequate but are subject to a couple of deficiencies. For example, in the Chow article referenced above, the bit fine tuning process operates basically as follows: if the achieved overall bit rate $B_{total}$ exceeds the target bit rate, $B_{target}$, the array containing the differences in the rounding operation (i.e., the ROUND[$b_i$]–$b_i$) values) is examined. The sub-channel with the smallest difference is located, and a single bit is subtracted from that sub-channel, reducing $B_{total}$ by one. This process is repeated (i.e., the next smallest difference is now located) until $B_{total}$ is equal to $B_{target}$. For the case where $B_{total}$ is below the target bit rate, $B_{target}$, the sub-channel with the greatest difference is located, and a single bit is added to that sub-channel, increasing $B_{total}$ by one. As before, this process is repeated (i.e., the next largest difference is now located) until $B_{total}$ is equal to $B_{target}$. This approach is simple, but its computational complexity is a direct function of the number of bits to be added or subtracted to achieve the target bit rate. Furthermore, this technique does not consider the power margin of the sub-channel, and for that reason, it is unable to approach the optimum performance. Finally, the bit fine tuning process described in Chow is tied to the initial bit and energy loading algorithm, making it difficult for it be extended easily to other bit and energy loading implementations. Accordingly, all the prior art described immediately above have a number of drawbacks and shortcomings which result in ADSL systems having reduced performance levels or requiring extensive computations.

SUMMARY OF THE INVENTION

An object of the present invention, therefore, is to provide a high speed communications system with overall improved data throughput, bit-error rate, and power margin performance for any given limited bandwidth channel, such as found in a typical digital subscriber loop; and A further object of the present invention is to provide a high speed communications system which is easily adaptable to a large variety of real world channel environments as might be found in typical subscriber loops, such as variable line conditions, variable noise conditions, varying target data rates, varying bit error rates, etc.; and Another object of the present invention is to provide a high speed communications system which is implementable in simple circuitry and thus reduces the overall cost of such systems;

Yet another object of the present invention is to provide a high speed communications system which quickly and accurately determines the initial characteristics and optimal transmission parameters of the channel, and is thus able to achieve an initial data link with a minimal amount of time delay from protocol setup and handshaking procedures;

A further object of the present invention is to provide a high speed communications system which is compatible with typical and well-known enhancement add-ons of high-speed data links, including Trellis coding, echo-canceling, and similar options;

Another objective of the present invention is to provide a real-time, adaptive, high speed communications system which, even after initialization, continues to dynamically alter transmission parameters depending on variations in channel characteristics, new target data rates, new target bit-error rates, etc.; and Yet another objective of the present invention is to provide an improved method for determining initial optimal energy and bit distributions for sub-channels carrying information in a narrow bandwidth, high-speed, and multi-carrier communications system, such that overall improved data throughput, bit-error rate, and power margin is achieved for any given limited bandwidth channel, such as in a typical digital subscriber loop; and A further aspect of the present invention provides an initial channel transmission bit and energy loading process which determines the characteristics and transmission parameters of a communications channel, and based on target data and bit-error rates, quickly and accurately computes sub-channel bit and energy loading for sub-channels having differing frequency carriers; and Yet another objective of the present invention is to provide a channel transmission fine-tuning process that measures channel characteristics on an ongoing basis, and dynamically alters transmission parameters, such as the bit and energy loading in the sub-channels, in response to channel changes and target data rates and bit-error rates;

Another objective of the present invention is to provide a channel transmission fine-tuning process that is adaptable and flexible enough to be used in conjunction with a variety of initial channel transmission bit and energy loading process, including the aforementioned prior art processes;

Another objective of the present invention is to provide initial bit and energy, and bit fine-tuning processes that are computationally simple and only require a small amount memory so that they are implementable with low cost circuitry and hardware.

These and other objects of the present invention are effectuated by novel initialization and fine tuning processes implemented in high speed circuits intended primarily for use in conventional multi-channel communications systems.

The initialization circuit includes a high speed memory for storing transmission parameters such as signal-to-noise ratios and data capacities associated with the sub-channels. A processing unit, preferably a digital signal processor (DSP), determines optimal setup values via an initialization routine. Specifically, the transmission capacity of each sub-channel is optimized based on measured signal-to-noise ratios, a target data rate R, power performance margins, available system transmission power, etc. The initialization routine includes a series of operations for computing the transmission capacities and related parameters, and is executed iteratively (i.e., repeatedly) until either compliance with system target goals is achieved or a timeout condition is reached. To maximize the data rate and optimize the data/energy loadings, the initialization routine introduces novel evaluation criteria parameters, such as minimum ($b_{min}$(i)) and maximum ($b_{max}$(i)) bit loadings for each of the sub-channels, and power modification factors $e_{min}$(i) and $e_{max}$(i) associated with such loadings. Furthermore, to conform to certain transmission spectrum requirements in systems such as xDSL, a sorting is performed on an array consisting of the values $(e_{max}(i)-e_{min}(i))/(b_{max}(i)-b_{min}(i))$. The transmission capacity is dropped in the sub-channels in the same order as this array so as to minimize the bit rate drop while conforming to such transmission power requirements.

In another embodiment where the objective is to achieve a target rate by adjusting the power margin and where (such as xDSL) an output transmission power spectrum is subject to certain additional constraints, an initial bit rate is first calculated based on an assumed power margin. By estimating a required power margin change, two bit rates $R_{min}$ and $R_{max}$ can be obtained that bound the target rate $R_{target}$ (i.e., $R_{min} < R_{target} < R_{max}$). A binary iteration can then be used to find a power margin ($\gamma_m$) that achieves $R_{target}$. Specifically, if a power margin $\gamma_{min}$ is associated with data rate $R_{min}$, and a second power margin $\gamma_{max}$ is associated with rate $R_{max}$, a new power margin $\gamma_m = \sqrt{\gamma_{min} * \sqrt{\gamma_{max}}}$ is used to obtain a new bit rate R. A new interval (either [R, $R_{max}$] or [$R_{min}$, R]) is then used to bound target rate $R_{target}$. Either $\gamma_{min}$ or $\gamma_{max}$ (as the case may be) is then set to $\gamma_m$ as the interval that bounds the final power margin that achieves the target rate. The process is repeated until $R = R_{target}$.

In another variation of the initialization circuit, an iteration criteria parameter can be implemented so that the number of iterations, or the total timeout period for roughly configuring the system can be controlled. This feature may be advantageous in those situations where rapid set-up time is required, or where it is understood that the additional gain from additional iterations of the target data rate R is only marginal.

The fine tuning process of the present invention is utilized after the initialization process discussed above, to dynamically adapt transmission parameters (including data capacities) as needed in response to varying transmission channel characteristics, system constraints, bit rate targets, user input, etc. A first embodiment of the fine tuning process uses the same front end executable microcode routine as the initialization so that the two processes share a significant amount of operational and functional overlap. In this manner, a complete and optimal bit and energy configuration solution can be implemented for a high speed multi-channel system. Since the fine tuning process overlaps in function substantially with the initialization process, the amount of redundant code is minimized, and the performance of the system is maintained during start-up and later transmissions.

A second embodiment of a fine tuning process is more specifically adapted for use with prior art initialization routines. Compared to prior art fine tuning processes, this second embodiment allows for data convergence under operating conditions which are otherwise unmanageable. In other words, under some circumstances where a prior art initialization routine is only able to roughly configure the data capacity values, the present invention is nevertheless able to make use of such values and bring the system swiftly into target bit convergence.

In another variation of the present invention, a system may be implemented that uses the aforementioned bit/energy loading process, as well as both of the aforementioned fine tuning processes. In this manner, variations in transmission characteristics and/or target parameters are handled even more efficiently since the fine tuning process best suited for the particular needed adaptation can be invoked as needed. For example, where target data rates vary significantly, the first fine tuning process is much faster than the second fine tuning process; conversely where the achieved data rate deviates only slightly from the target rate, the second fine tuning process is somewhat more efficient in effectuating a rapid convergence.

In applications where the required bit error rate may vary according to the type of information being transported by the specified sub-channels, the power margin can be individually adjusted to reflect this fact and the same initialization and fine tuning routines can be applied.

Because of the unique approach taken by the present invention in configuring the data capacities, a user of such system has the latitude of operating such in one of two modes; one that maximizes a data rate R for any given value of power margin $\gamma_m$, and another that maximizes power performance margin for a given value of a target bit rate $R_{target}$.

Although the inventions are described below are in a preferred embodiment implementing the ADSL standard, it will be apparent to those skilled in the art the present invention is not limited in this respect, and would be beneficially used in any high speed multi-carrier application.

BRIEF DESCRIPTION OF THE DRAWINGS

FIGS. 1A, 1B and 1C are graphs showing the undesirable convergence properties of a prior art iterative bit loading process for use in an ADSL environment;

FIG. 7 is a flowchart depicting the sequence of steps utilized in a first embodiment of a bit fine tuning process of the present invention;

DETAILED DESCRIPTION OF THE INVENTION

Figure 2:
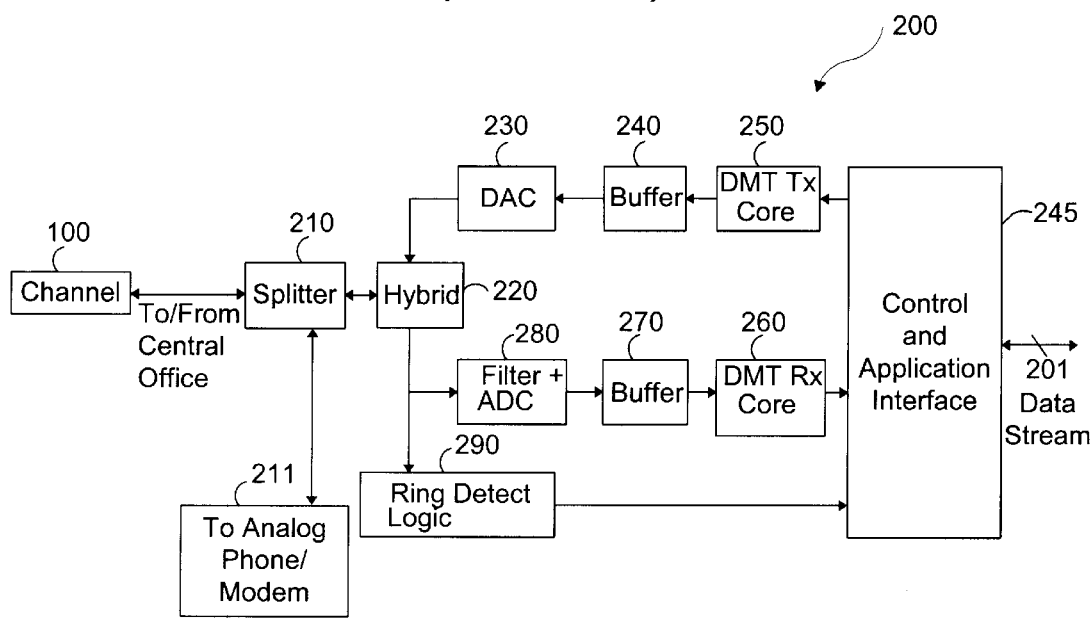
FIG. 2 is a block diagram of a typical high-speed transceiver, such as an ADSL modem, in which the present invention can be employed.

The basic structure of an ADSL transceiver in which the present invention is employed is depicted generally in FIG. 2. With the exception of some of the details pertaining to DMT Rx Core 260 and DMT Tx Core 250, the other circuitry embodied in the block diagram of FIG. 2 is not material to the teachings of the present invention. This circuitry is well-known in the art, and can be implemented by skilled artisans in a variety of ways. The explanation of the structure and function of these remaining components of the ADSL transciever 200 are given here primarily as background for understanding the context of the present invention, and it will be understood by those skilled in the art that these are only typical implementations of such components, and, more importantly, that the present inventions can be beneficially utilized as well in a wide variety of non-ADSL communications environments employing similar multi-carrier DMT technology.

In FIG. 2, transciever 200 is connected through a channel 100 to a second transciever 100' (not shown). As described above, in ADSL applications, channel 100 is typically made of regular copper wire "loop", and each such loop may have different electrical properties, transmission lengths (sizes), varying attenuation characteristics, and a number of impairments or interferences. It will be apparent to those skilled artisans, however, that the present invention can be used in conjunction with any number of different channel environments having different operating characteristics and associated impairments. Transceiver 200 may be located in a remote "downstream" subscriber site, or at an "upstream" central office site.

At the other end of transceiver 200 is Control and Application Interface 245, which is responsible for receiving and processing a high rate input bit data stream 201. This data stream, again can originate from one or more data sources (WAN, LAN, host storage devices, etc.), and can include a variety of types of digital information as mentioned above, including data, video, control signals, etc. from various host computing devices, electronic libraries, Internet service providers, and high definition television broadcasters and similar sources.

The encoded data stream is then processed by DMT Transmit (Tx) Core 250. In this preferred embodiment, the novel energy and bit loading procedure of the present invention can be employed at this stage of the data transmission process. Again, this loading procedure can be used alone or in combination with the novel bit fine tuning procedure described in more detail later.

Figure 3:
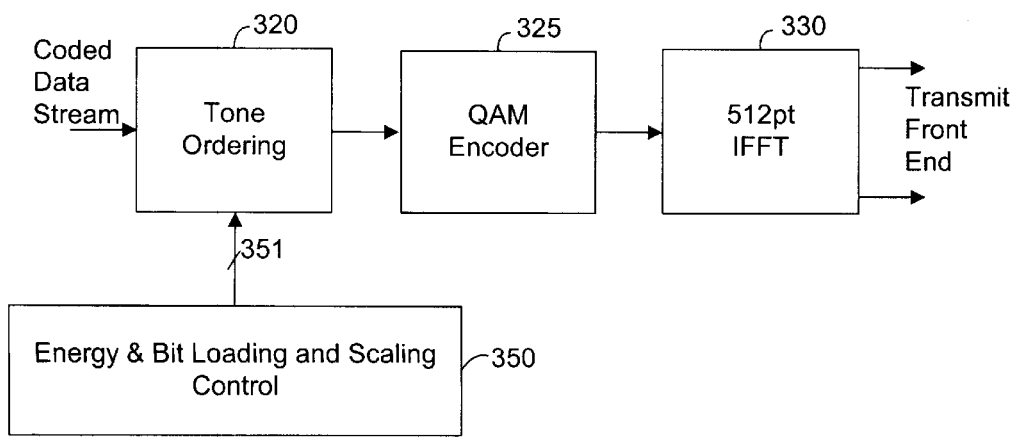
FIG. 3 is a block diagram of a circuit for implementing the bit and energy loading and bit fine tuning procedures of the present invention.

DMT Tx Core 250 operates generally as follows. As shown in FIG. 3, a Tone Ordering circuit 320 allocates bits from the error encoded serial bit stream under control of Loading circuit 350 (shown in more detail in FIG. 4) at a given symbol rate T (equal to 246.38 ms in T1E1.413 standard), and a target $B_{target}$ bits/symbol (typically from 100 to 1500), so that the serial bit stream is grouped in parallel over the QAM sub-channels. Details of Loading circuit 350 are provided below as they represent the bulk of the present invention. It will be understood by those skilled in the art, after reading such description below, that this circuit provides the optimal bit and energy allocations both initially and during fine tuning as compared to that previously available in prior art systems. For this reason, an ADSL transciever employing such invention can achieve higher performance levels than heretofore available. It is also known that the serial data stream 201 can undergo well known cyclic redundant check (CRC) error detecting, forward error correcting coding (FECC), and interleaving operations at DMT Tx Core 250 to improve the system's tolerance to various kinds of noise sources such as impulse noise and line cross-talk.

The output of Tone Ordering circuit 320 is passed onto QAM encoder 325, again a conventional and well-known circuit, which produces complex amplitudes, representing a signal point in a constellation of $2^{b_i}$ signal points, scaled in accordance with the energy distribution appropriate for each sub-channel bit allocation. A series of buffers in IFFT (Inverse Fast Fourier Transform) circuit 330 are thus loaded with data corresponding to the number of bits ($b_i$) and amplitude for each sub-channel.

For ADSL modulation based on the T1E1.413 standard, 255 sub-channels using 255 separate frequencies spaced 1/T apart are allocated. After adding an additional baseband channel for voice transmissions, an IFFT circuit of size 512 is then used (256 complex points from QAM plus their 256 complex conjugates) to generate 512 real time-domain samples. It will be apparent to skilled artisans that various modifications could be done to the above DMT Tx Core circuits for other multi-carrier systems.

To avoid inter-symbol interference (ISI) due to the band-limited DSL channel, it is well known in the art of multi-carrier systems that a prefix can be added to the ordered data output of DMT Tx Core 250, which is the same as the last few IFFT output points. In the case of T1E1.413 standard, the prefix for downstream transmissions has a length of 32 and is called the cyclic prefix; the upstream prefix length is 4. After this, the parallel data stream is converted to a serial stream by Buffer 240 and then processed by Digital to Analog Converter 230 using well-known techniques. The converted data is then sent to appropriate filters for out-of-band signal suppression and Hybrid circuit 220 for duplex transmission coupling. As well-known in the art, a hybrid serves as an interface between telephone 2-wire lines and 4-wire lines. It consists primarily of filters, transformers, and isolation circuitry.

While not shown expressly here in the transmitter section, the present invention is also completely compatible with, and can be used in conjunction with a technique known in the art as Trellis Coding. Trellis code modulation (TCM) is an error correction coding scheme commonly used in multi-carrier systems to provide additional coding gains. In addition, echo-cancellation, another common feature of ADSL may also be advantageously employed with some systems incorporating the present invention.

The receiving side structure and operation are analogous to the transmission side of Transceiver 100, and for that reason it will not be discussed in detail at this point. In brief, an analog data signal 101 is received by Splitter 210, a standard circuit, which separates a DMT signal consisting of the 255 QAM sub-channels from the voice-band POTS analog signal. The latter signal can be used for simultaneous voice or conventional analog/ISDN modems. A ring detect logic circuit 290 can also be implemented using accepted techniques in some embodiments, to alert a Control Interface 295 to the existence of a received signal originating from the second transceiver 101'. The analog received signal is filtered and converted to digital form by ADC 280 and stored in Buffer 270.

DMT Receiver Core 260 is generally responsible for monitoring and measuring the SNR of the sub-channels falling within the frequency range passed by FILTER and ADC 280, and for extracting the original data stream from the numerous sub-carriers. This circuit is similar to DMT Tx Core 250, in that the "inverse" operations (for example, FFT instead of IFFT) are now performed on the received data stream to reconstruct the original serial data stream originating on the input side of transceiver 100.' As such details are well-known in the art for ADSL applications, they will not be repeated here.

Energy and Bit Loading Circuit

Figure 4:
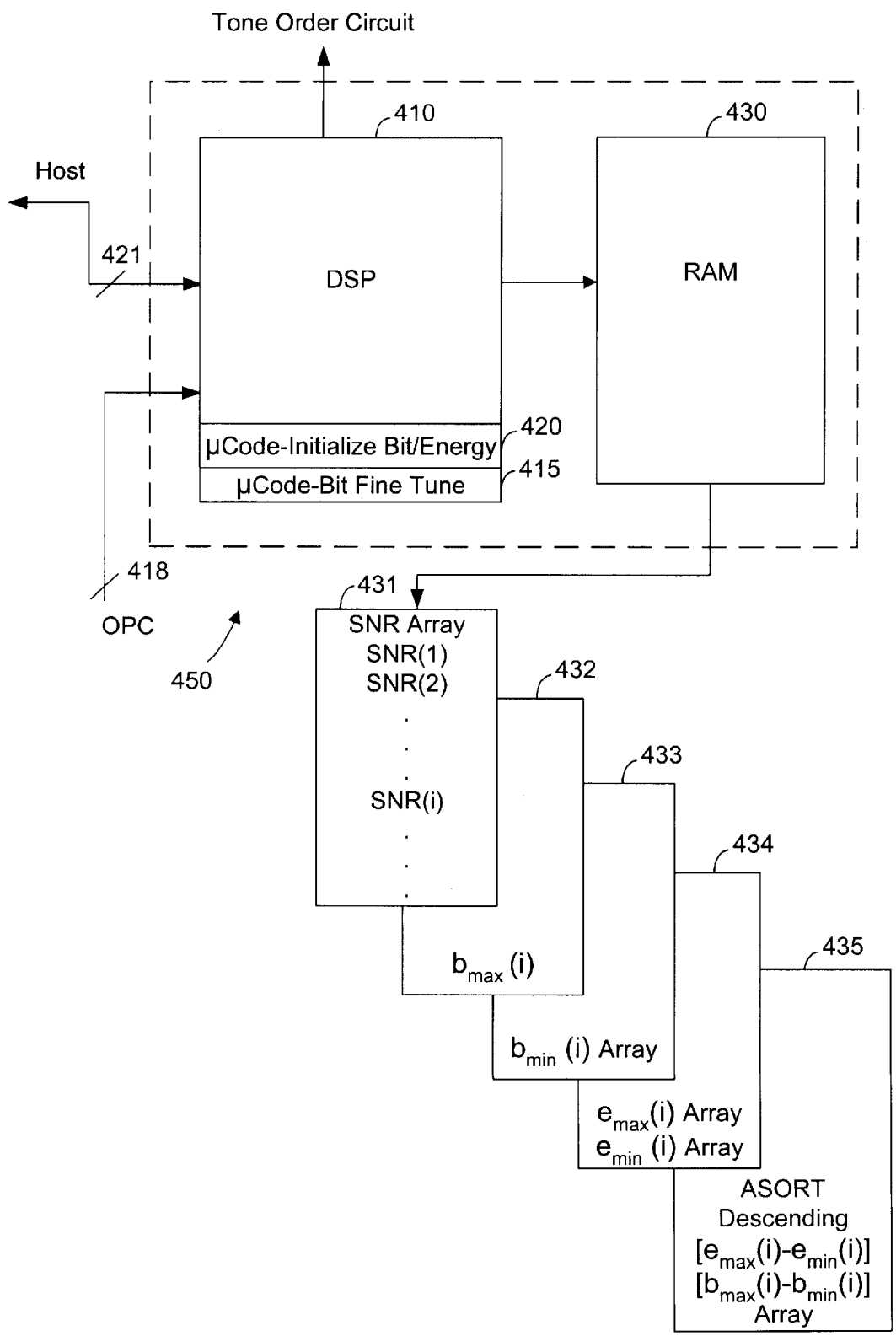
FIG. 4 is a more detailed block diagram of some of the more pertinent portions of the circuit of FIG. 3.

Energy and Bit Loading circuitry 350, which, as mentioned above, generates a sub-channel bit and energy control output to Tone Ordering circuit 320, is shown in detail in FIG. 4. Energy and Bit Loading circuitry 350 preferably includes a digital signal processor (DSP) 410 (or some suitably fast microprocessor, or even a host processor in a software modem implementation) including an on-board program ROM (or other suitable memory) if necessary for storing executable micro-code routines. Portions of the bit and energy loading initialization process and the bit fine tuning process are embodied in these routines in portions 415 and 420 respectively of the ROM. The specifics of this micro-code implementation are not material to the present invention, and will vary from processor to processor.

DSP 410 is also coupled to an Operations Control Channel (OPC) 418 for monitoring transmission characteristics of channel 100. Operations control channel 418 is used for transmitting and receiving control information between transceiver 100 and second transceiver 100'; this control information includes, for example, signal to noise ratio information for the individual sub-channels and other overhead information. Other system parameters, such as target bit rate, target error-rate, performance margin, etc., are provided by host controller 480 (not shown) from data path 421.

A RAM 430 is used by DSP 410 for storing raw data and calculation results pertaining to the inventive processes described below. RAM 430 includes support for a received signal-to-noise ratio array {SNR(i)} 431; sub-channel bit allocation arrays {$b_{max}(i)$} 432 and {$b_{min}(i)$} 433; sub-channel energy offset factors {$e_{max}(i)$} 434 and {$e_{min}(i)$} 435 and array 436, which is a sorted sequence (ASORT) in descending order of {[$e_{max}(i)-e_{min}(i)$]/[$b_{max}[i]-b_{min}[i]$])}. Other system parameters such as the number of channels used, power margin, the target bit rate, the actual achieved bit rate, system performance margin, and various numerical constants required in the iterative processes described below can also be stored in portions of RAM 430. It is apparent that the precise form of RAM 430 is not critical, and that portions of the above parameters may be stored in a number of conventional forms, such as in one or more standard RAM's, a cache RAM, DSP registers, etc. The only material consideration for purposes of the present invention is that there be some mechanism for keeping track of the information in the above arrays.

Energy and Bit Loading Process

Figure 5:
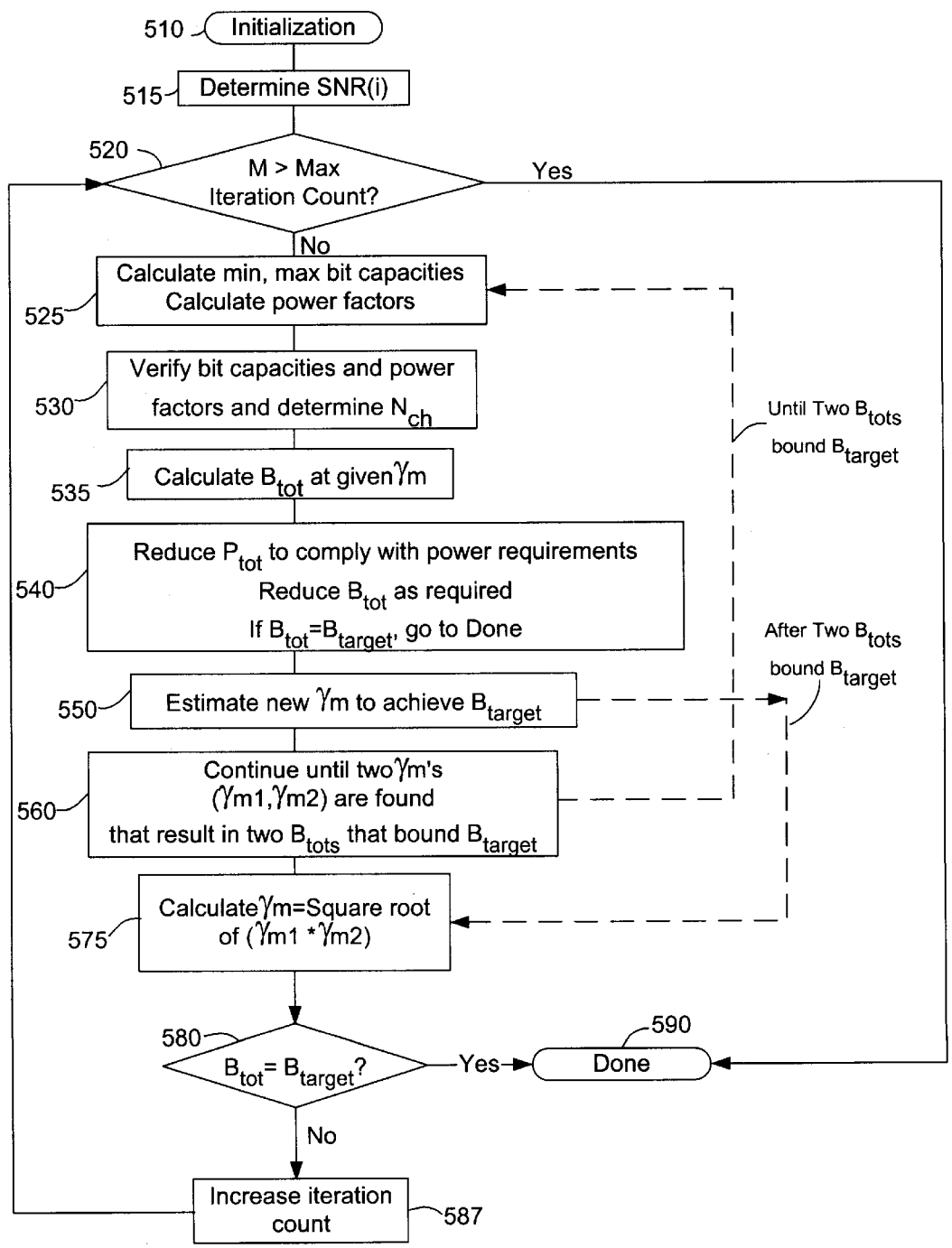
FIG. 5 is a flowchart depicting the sequence of steps performed during the energy and bit loading process of the present invention.

The preferred embodiment of the bit and energy loading process 500, and specifically as it is implemented in micro-code routine 420 executed by Bit and Energy Loading Circuit 350, is shown in a flow chart form in FIG. 5. The process may be summarized as follows:

1. At step 510, a target bit rate, $R_{target}$ is initialized by host 480, along with a target bit error rate $P_e$. In a typical ADSL implementation using the present invention, the target bit rate can include rates in excess of 6 Mb/s, and the bit error rate is $10^{-7}$. Given the target rate, the total number of bits that should be allocated over the available sub-channels is $B_{target}=R_{target}/R_{symbol}$, where $R_{symbol}$ is the source symbol rate (e.g. in T1E1.413, equal to 4 kHz). Host 480 also sets the system power margin $\gamma_m$ to some initial constant, such as 10 dB, and specifies the permissible range of the output power spectrum density (e.g. −40 dBm/Hz±3 dB downstream and −38 dBm/Hz ±3 dB upstream in T1E1.413 transmission) and the maximum allowed output power (e.g. −40 dBm/Hz times 4.3125 kHz times the total number of active sub-channels). The total number of available sub-channels $N_{ch}$ is also set to the maximum (e.g. 255 in T1E1.413 downstream transmission using echo cancellation). Finally, an iterative criteria count M (e.g. 10) can be set by the host 480 as well to provide an additional level of control over the number of iterations used by the bit and energy loading process. This parameter can be determined automatically by host 480, or configured by a user of the transceiver based on performance issues such as maximum desired set-up times. For example, by reducing the number of iterations, the set-up time and system overhead also can be reduced. The iterative criteria count must be based, of course, on the performance capabilities of any bit fine tuning process used on top of the initial bit and energy loading process; in other words, the result of the initial bit and energy loading must be within limits that are capable of being "fine tuned" by any bit fine tuning process implemented in the system.

2. Next, at step 515, received SNRs for each of the subchannels are measured by standard routines which are known in the art such as specified by the T1E1.413, where the output spectrum density for each sub-channel is set to a constant of −40 dBm/Hz downstream and −38 dBm/Hz upstream. Specifically, the SNR measured in this case can be given by $$SNR_i = E_{ref} |H_i|^2 \frac{1}{N_i} \quad \text{Equation (2)}$$

where $N_i$ is the spectrum density of the total received noise and $E_{ref}$ is the reference energy loading. The values for the subchannel SNR(i) are stored in array 431 for later use in the process.

3. During the first step 525 of the iteration routine, a number of important parameters are calculated, including power modification factors $e_{min}(i)$ and $e_{max}(i)$. These factors represent the modification for each sub-channel so that the corresponding bits obtained from Equation (1) are integers, respectively. Specifically, if we use Equation (1) to obtain $b_i$, then $b_{min}(i)$=ROUND ($b_i$) and $b_{max}(i)$=ROUND($b_i$)+1; these values are stored in arrays 433 and 432 respectively. Following this calculation, $e_{min}(i)$ and $e_{max}(i)$ can then be computed as:

$$e_{\min}(i) = \frac{2^{b_{\min}(i)} - 1}{SNR_i} \gamma_m \gamma_b$$

$$e_{\max}(i) = \frac{2^{b_{\max}(i)} - 1}{SNR_i} \gamma_m \gamma_b$$

The power factors are stored in array 434. By examining Equation (1), these factors should be likely within [0.5, 2.0], which explains why T1E1.4 allows a ±3 dB variation of the reference power spectrum density.

4. At step 530, the factors $e_{min}(i)$, $e_{max}(i)$, $b_{min}(i)$, and $b_{max}(i)$ obtained above are further verified in order to meet the specifications of a given multi-carrier system. For T1E1.413, the following specific verifications for each sub-channel i are performed.

a. Check if both $b_{min}(i)$ and $b_{max}(i)$ are below 2, the minimum number of bits for QAM modulation. If yes, the channel is disabled, all $e_{min}(i)$, $e_{max}(i)$, $b_{min}(i)$, and $b_{max}(i)$ are set to zero, and the verification is finished for the given sub-channel.

b. Check if both $b_{max}(i)$ and $b_{min}(i)$ are greater than 15, the maximum number of bits for QAM modulation. If yes, both $b_{max}(i)$ and $b_{min}(i)$ are set to 15, and $e_{min}(i)$ and $e_{max}(i)$ are set to 0.5 (i.e. −3 dB). If not, check if only $b_{max}(i)$ is greater than 15. If yes, it can be easily seen that $b_{min}(i)$ should be set to 15. Therefore, set $b_{max}(i)$ to 15 and set $e_{max}(i)$ to $e_{min}(i)$.

c. Check if only $b_{min}(i)$ is smaller than 2. If yes, set $b_{min}(i)$ to 0 and set $e_{min}(i)$ to 0.

d. Check if $e_{max}(i)>2.0$ (i.e. +3 dB) and $e_{min}(i)=0$ (as a result from step c). If yes, it mean the received SNR is too small and requires more than a 3 dB energy increase. In this case, set both $b_{max}(i)$ and $e_{max}(i)$ to 0.

e. From the above steps, disable all those channels that have both $b_{min}(i)$ and $b_{max}(i)$ equal to zero; reset the number of available channels, $N_{ch}$ to be equal to the number of sub-channels that are not disabled.

f. It can be seen, from the above, that the present invention utilizes a unique approach unlike that of prior art xDSL bit/energy loading systems. Instead of merely determining a nominal bit capacity, the present invention determines maximum and minimum bit capacities for each sub-channel, as well as necessary energy characteristics required to effectuate such loadings, and then evaluates these parameters in determining which sub-channels should be disabled. As can be seen below, this approach yields an extremely fast, accurate and efficient convergence to the target data rate.

5. After the necessary modifications, at step 535, a total bit rate $B_{total}$ is computed by DSP 410 using a simple summation over $b_{max}(i)$:

$$B_{total} = \sum_i b_{\max}(i)$$

This level of bit loading implies that output energy of each sub-channel i is modified by a factor $e_{max}(i)$. The total output power across all sub-channels is thus equal to $$P_{total} = E_{ref} \Delta f \times N_{ch} \times \left[\sum_i e_{\max}(i)\right]$$

6. If a multi-carrier system employing the present invention is intended to be compliant with the standards of T1E1.413, which has further total power limitations, the following two steps are executed. At step 540, an array of values $$\frac{e_{\max}(i) - e_{\min}(i)}{b_{\max}(i) - b_{\min}(i)}$$

are calculated, sorted and stored in array 435 in descending order. If a particular channel is disabled, it is not considered in the sorting. Those skilled in the art will recognize that these values essentially represent the power energy drop that could be accomplished by removing a bit from the sub-channel in question.

7. According to the above sorted sequence, total output power $P_{total}$ is decreased by sequentially substituting $e_{max}(i)$ with $e_{min}(i)$. For each such substitution, $b_{max}(i)$ is also set to $b_{min}(i)$. As a result, the total number of bits $B_{total}$ is decreased by $b_{max}(i)-b_{min}(i)$. This step proceeds until the total output power $P_{total}$ is within the specified level. In the case of T1E1.413, the following condition needs to be satisfied:

$$\sum_i e_{\max}(i) \leq N_{ch} \qquad \text{Equation (3)}$$

8. From steps 6 and 7, one skilled in the art can make the following three observations. (1) It can be seen generally that this methodology is extremely efficient in that those sub-channels that require the most extra energy to achieve an extra bit's worth of capacity are reduced first, thus guaranteeing the least effect on bit rate for any particular needed reduction in power. The total number of bits $B_{total}$ is thus maximal for the given power margin $\gamma_m$ and under all system requirements including the power spectrum density, total output power, and permissible bit allocation range. (2) As a result, the optimal $B_{total}$ is a monotonically decreasing function of power margin $\gamma_m$ (3) From Equation (1), a 3 dB increase or decrease of power margin $\gamma_m$ will approximately decrease or increase the total bits $B_{total}$ by an approximate amount of $N_{ch}$, which is the total number of active sub-channels. In general, the larger the SNR for each sub-channel, the better this approximation.

9. From observations made in Step 8, $B_{total}$ is compared at step 550 with target bit rate $B_{target}$. An estimation of the power margin change is made based on the following equation:

$$\Delta\gamma_m(dB) = 3 * (B_{total} - B_{target})/N_{ch} \qquad \text{Equation (4)}$$

Those skilled in the art will appreciate that this approximation is very good for those cases where the SNR for the available sub-channels are reasonably large. A new power margin given by $\gamma_m + \Delta\gamma_m(dB)$ is also calculated.

10. At step 560 the new estimated power margin $\gamma_m$ is used to repeat steps 3 to 7 to get a new $B_{total}$. This is repeated one or more times, as shown by the small dotted line connecting steps 560 and 525, until two of the $B_{total}$s obtained from this process first form an interval bounding (covering) the target bit rate $B_{target}$. In this manner, a rough or approximate convergence to $B_{target}$ is rapidly effectuated.

11. After this rough convergence, a second iterative routine is used to achieve the final precise bit rate. Since $B_{total}$ is a monotonic function of power margin $\gamma_m$, a binary iteration, which is well known in the art can be used to iterate the power margin until $B_{total}=B_{target}$. Specifically, if $[B_{min}, B_{max}]$ is the rough interval obtained from step 11 that covers $B_{target}$ and let the corresponding power margins of $B_{min}$ and $B_{max}$ be $\gamma_{max}$ and $\gamma_{min}$, respectively, the new power margin is set at step 575 to $$\gamma_m = \sqrt{\gamma_{min}\gamma_{max}}.$$

12. Steps 3 and 9 are repeated (as shown by the heavy dashed lines in FIG. 5) until either the target bit rate is achieved at 580 or the maximum iteration count is exceeded at step 520. In practice, we have discovered that a typically useful value for M is 10, and this count is incremented each time through this loop as shown in step 587. It is apparent that the iteration count checking portion of the process could be accomplished with equal usefulness in the beginning of the routine, for example, prior to performing step 525.

Figure 6A:
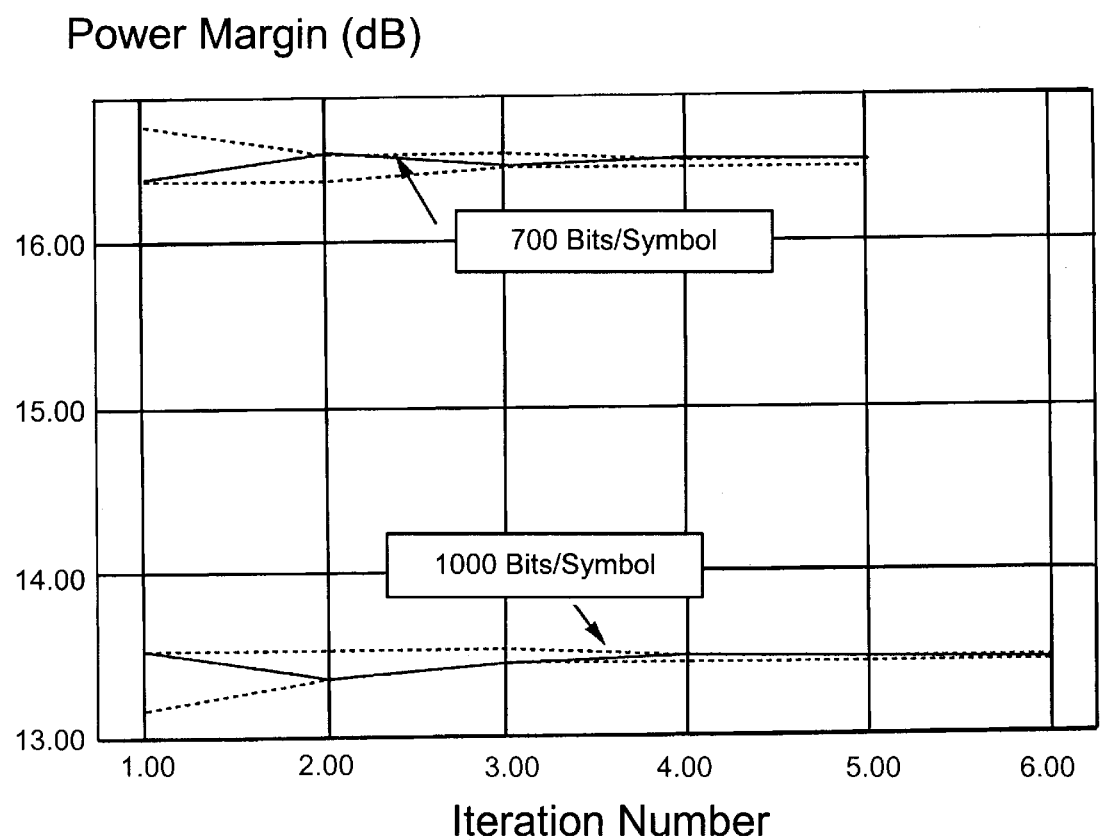
FIGS. 6A and 6B are graphs illustrating power margin and total bits (data rate) convergence obtained by the present invention using target bit rates of 700 and 1000 bits/symbol.
Figure 6B:
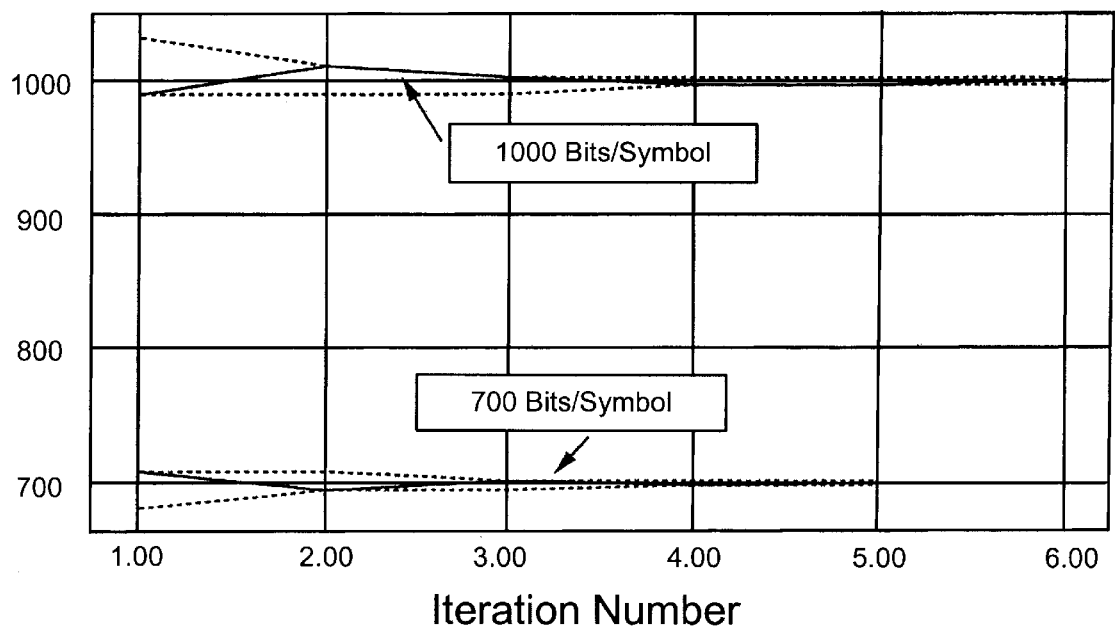

FIGS. 6a and 6b illustrate the fast convergence of the present invention for a typical T1E1.413 ADSL implementation. The target bit rates illustrated are 700 bits/symbol and 1000 bits/symbol, respectively. As demonstrated in FIG. 6a, the iterated power margin interval is indicated in dotted lines, while the calculated power margin is indicated with the solid line. From this graph one can observe immediately that the power margin interval already starts off rather small (as a consequence of the useful predictive estimation used in the present process) and shrinks rapidly in time so that only 5 iterations (for 700 bits/symbol) or 6 iterations (for 1000 bits/symbol) are needed to effectuate complete convergence. The extremely precise power margin estimation results directly in an extremely rapid data rate convergence, as well, as illustrated in FIG. 6b where an iterated bit rate interval is indicated in dotted lines, while the calculated bit rate is indicated with the solid line. Thus, the present invention rapidly converges to the proper bit rate in a very small number of iterations, which is also beneficial since each iteration takes a finite amount of computing time and processing power, and it is extremely desirable to achieve convergence as quickly as possible. When target bits are 1200 bits/symbol and 1600 bits/symbol, it is found there is even no need for further iterations since the exact bit rates are obtained even during step 11.

Figure 1A:
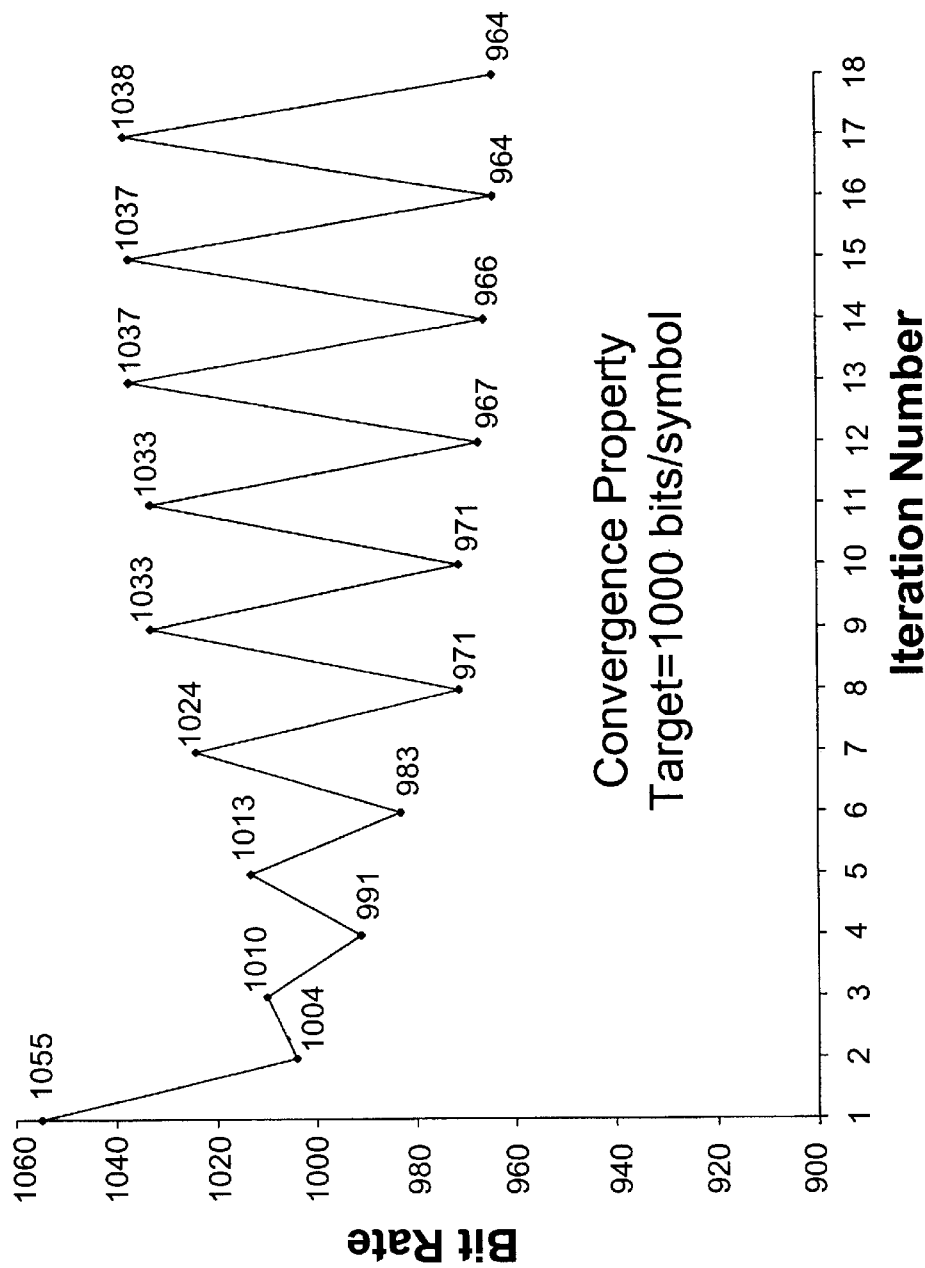
Figure 1C:
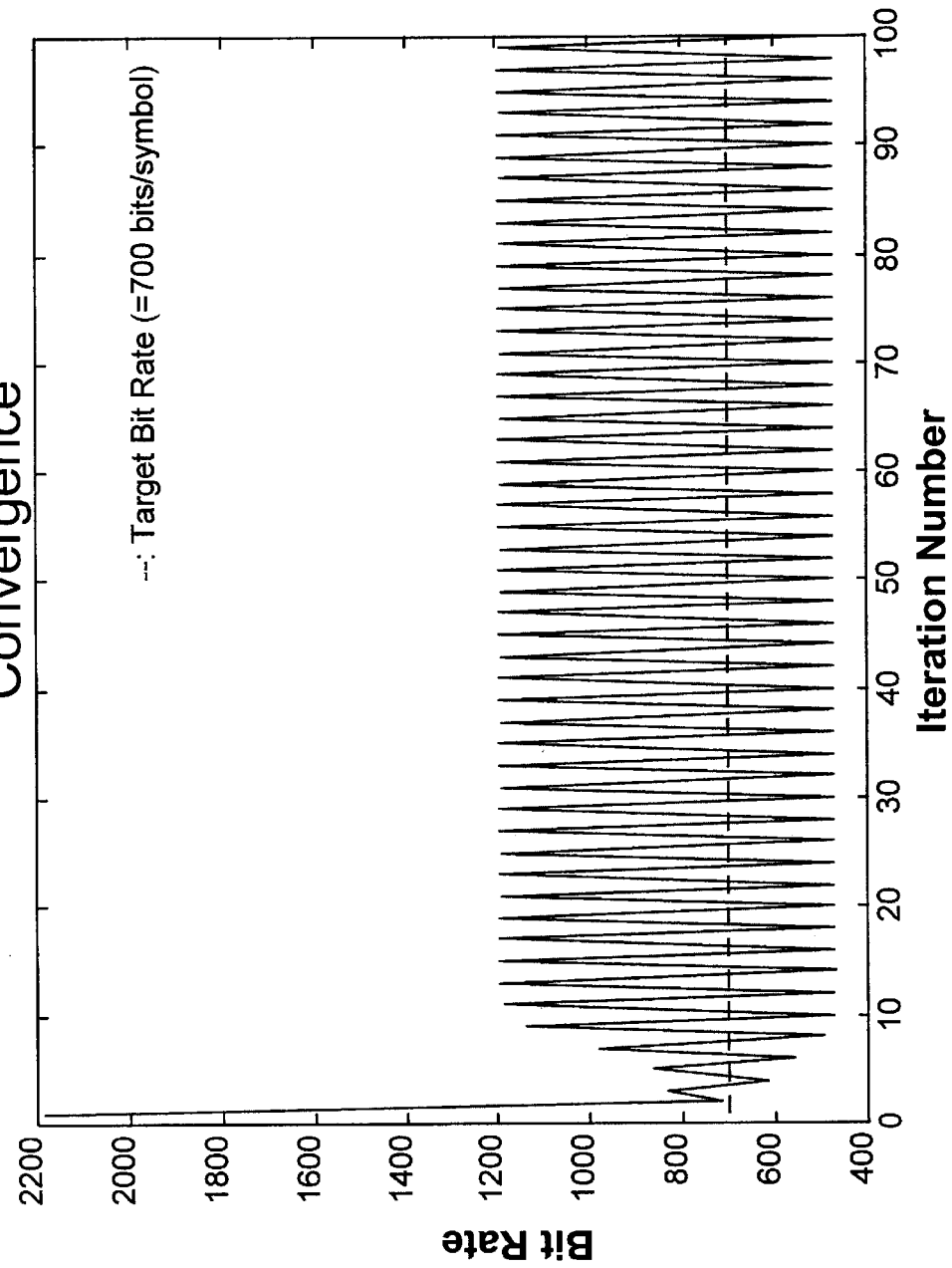

A number of observations can be made about the above bit and energy loading process. First, the present invention provides tangible and observable differences in performance. As can be seen by comparing FIG. 6a with FIG. 1B, for a typical target rate of 700 bits/symbol, the present invention converges exactly to the target rate within a few iterations, as compared to the prior art which has oscillations even after 50 iterations. It is believed by the applicants that one of the primary factors causing oscillations in the prior art is the rounding of $b_i$, a nonlinear operation. The present invention, on the other hand, uses the binary iteration method, which not only guarantees convergence, but also achieves it at a much faster rate.

The present invention can also accommodate applications that have different bit error rate requirements over the sub-channels. For example, digital video data, voice data, and computer data can tolerate different bit error rates (voice can be around $10^{-3}$ and data needs $10^{-7}$ or smaller). In such cases, the only difference is the bit error rate margin $\gamma_b$, to achieve the given bit error rate, which is now different for different sub-channels. Thus the same energy and bit loading process can be similarly applied.

Bit Fine Tuning Process

As evidenced by the aforementioned discussion, the present invention provides a bit and energy loading process for multi-carrier modulation with significant improvements over the prior art. The channel characteristics of any particular link, however, may be time dependent. For this reason, the overall bit rate, power margin, transmission output power, and/or individual bit capacity of any particular sub-channel may need to be modified once every certain time after an initial bit rate is initially established using the aforementioned bit and energy loading process. In particular, factors in the channel such as line temperature, line traffic, noise, line switching, and similar disturbances can significantly affect the received SNR after the bit and energy loading process is initially used.

For these reasons, it is advantageous to include some form of adaptive compensation to maintain overall system performance (same power margin), and/or to adjust for new system parameters to maintain the same target rate. For example, at some instance in time, it may be necessary to add or subtract a fixed number of data bits to maintain an overall level of error performance. In the present invention, when a new SNR is measured, dynamic adjustments to the total system output power and sub-channel energy and bit-loading can be made using the same bit and energy loading process disclosed earlier in FIG. 5. In other words, in this instance, the essence of Bit Fine Tune microcode routine 415 is implemented by Bit/Energy Loading microcode routine 420 discussed above in connection with FIG. 5. Specifically, execution of the Bit Fine Tune microcode routine is shown in FIG. 7 and is as follows:

1. Bit/Energy Loading microcode routine 420 is invoked at step 720, when a new data rate is required as a result of monitoring step 710, or as a result of determining the new SNR of each such-carrier monitored and stored at step 705 in array {SNR(i)} 431. At 720, a new total number of bits $B_{total}$ is computed at step 725 using the current power margin by repeating steps 3 to 7 in the above disclosed bit and energy loading process. If the objective of the dynamic bit fine tuning is to maintain the same power margin and error probabilities, there is no further need to proceed, and the routine returns at step 750.

2. If the objective is to maintain the same target bits or change to a different one, the steps 10 and 11 in the above bit and energy loading process are used at step 735 to find the interval of the power margin which the optimum power margin to achieve the target bits falls into.

3. Steps 3 to 11 are then repeated using the same binary iterative method disclosed in the above bit and energy loading process until either the target rate is achieved or the maximum iteration number is exceeded.

The bit fine tuning process of the present invention also has a number of additional beneficial characteristics over the prior art.

1. Since it uses the same energy and bit loading process disclosed earlier, it always maintains the optimum performance as it adapts to the new system characteristics.
2. It is not limited to the case where the measured SNR cannot change as in the prior art. In the present invention, new optimum energy loading and bit allocation can be rapidly achieved whether the change is due to a new target rate requested, a new power margin issued, or a new SNR measured. This is because the same energy and bit loading process is performed. On the other hand, the prior art performs fine bit tuning based on the previously measured SNR. Therefore, if there is an SNR change, all the results are based on invalid SNR assumptions.

Additional Fast, Backwards Compatible Second Embodiment of a Bit Fine Tuning Process for Smaller Bit Rates and/or SNR Changes As evidenced by the aforementioned discussion, the present invention provides a markedly improved initial bit and energy loading of DMT sub-channels from that of the prior art. Furthermore, when combined with sub-channel bit fine tuning as described above, a significantly enhanced multi-channel system is effectuated.

Nevertheless, while the bit fine tuning process described above is optimum in performance (i.e., maximum power margin) and fast in computation (i.e., rapid convergence), an alternative bit fine tuning process is further described here for even faster computation when the changes of the measured SNR and/or bit rate are relatively small. As can be seen below, it is useful in multi-carrier systems when the change of bits for each sub-channel is subject to further constraints. Moroever, it is compatible with many preexisting bit loading algorithms used in the prior art and therefore can be ported and adapted easily for use in any prior art environment. Accordingly, this second fine tuning embodiment can be used alone in certain environments where expected system requirements and parameters make it more attractive, or alternatively, it can be combined with and implemented alongside (or in conjunction with) the first fine tuning process described above.

Figure 8:
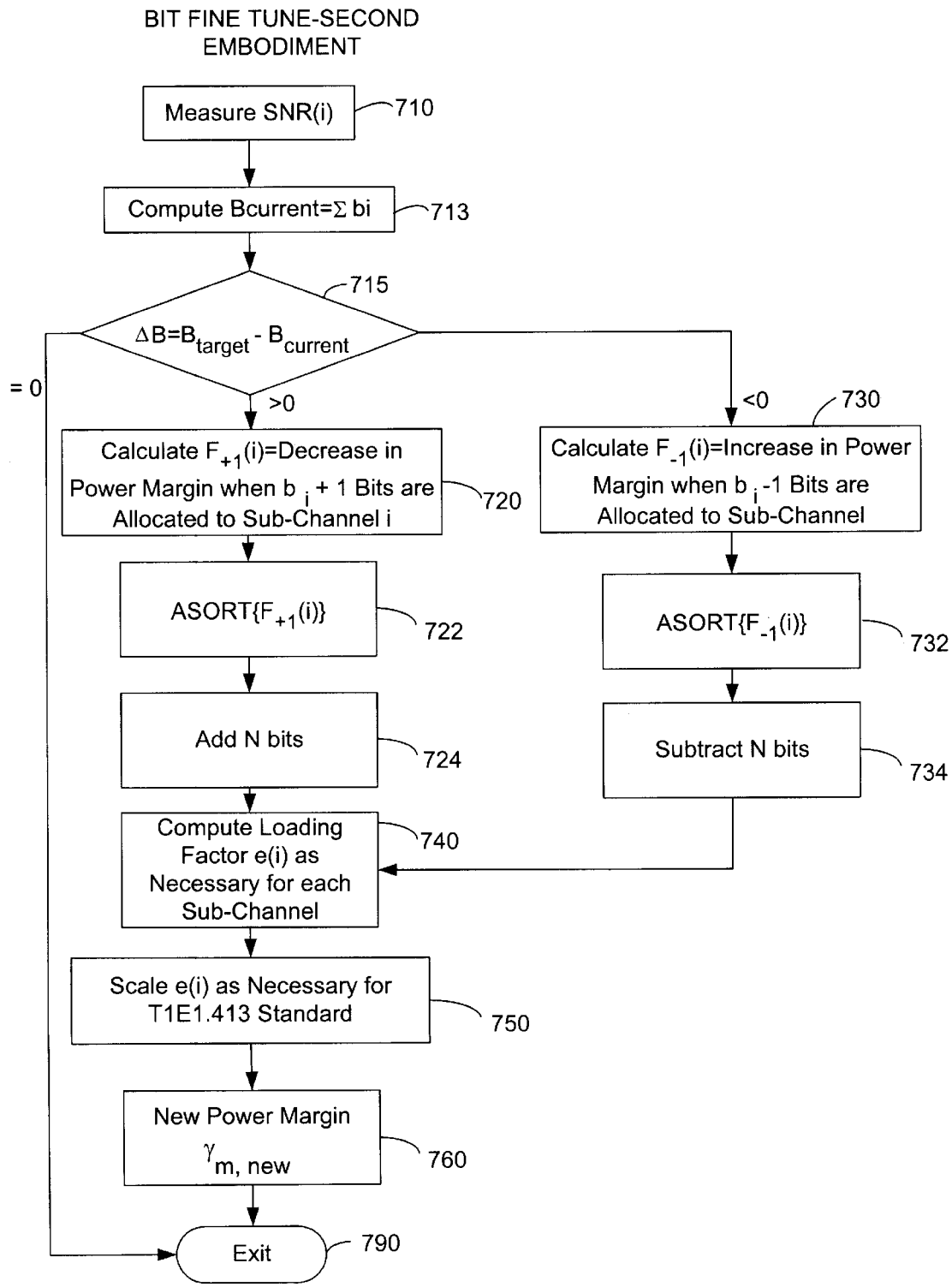
FIG. 8 is a flowchart depicting the sequence of steps performed during yet another embodiment of a bit fine tuning process of the present invention.

In addition, this alternative bit fine tuning process can be implemented in the same form as the bit/energy and previous bit fine tuning processes described above, i.e., as an executable routine 415 and associated parameter arrays within a ROM, RAM, etc. accessible to a signal processor (or equivalent). This new bit fine tuning procedure is shown in FIG. 8, and can be summarized as follows:

1. At step 710, the SNR of each sub-carrier according to Equation (2) is measured and stored in array $\{SNR(i)\}$ 431. It can be seen, therefore, that this process is adaptable for use with any prior art initialization processes, because, at least to date, all such bit/energy loading processes generate an $\{SNR(i)\}$ equivalent array 431.
2. Next, at 712 a new total bit number $B_{total}=\Sigma b_i$ is calculated using the current power margin $\gamma^*_m(i)=\gamma_m$ and Equation (1). If the energy and bit loading method disclosed earlier is used, the power margin used should be $\gamma^*_m(i)=\gamma_m/e_{max}(i)$ instead.
3. The new bit rate $B_{current}$ is compared at step 715 by computing $\Delta B = B_{target} - B_{current}$.

The case for $\Delta B=0$

4. In this case, the current achieved bit rate is equal to the target rate, so the fine tuning routine is finished and exits at step 790.

The case for $\Delta B>0$

5. If $B_{current}<B_{target}$, i.e., $\Delta B>0$, it is then necessary to add $\Delta B$ bits to increase the overall data rate. The routine then proceeds down the branch shown in FIG. 10 at step 720, during which time the following variable is calculated using DSP 410:

$$F_{+1}(i)=(2^{b(i)+1}-1)/(SNR(i)/\gamma^*_m\gamma_b)$$

$F_{+1}(i)$ in this case represents the power margin factor with respect to the current power margin $\gamma^*_m$ when $b_i+1$ bits are allocated for that sub-channel. Therefore, sub-channels that have large $F_{+1}(i)$ should be selected first for bit adding to minimize the overall decrease in system performance (i.e., bit error rate). At step 722, the subchannel effective margin array, $\{F_{+1}(i)\}$ 434, is then sorted in descending order (from highest to lowest margins) to form a new array ASORT $\{F_{+1}(i)\}$ 435. Given this sorted sequence, at step 724, a single bit is added to each sub-channel until either $\Delta B$ bits have been added or all sub-channel bits are updated. When adding bits, certain system constraints may need to be observed. For example, in T1E11.413, it is not permissible to have more than 15 bits per channel in the proposed ADSL standard, but this limitation may not be present in other environments using the present invention. The routine then proceeds to system performance margin evaluation step 740 which is discussed at step 8 below.

6. In the event a first pass through the ordered sub-channel margin array fails to load all the additional $\Delta B$ bits necessary to satisfy the target bit rate, i.e., some number X, where $X<\Delta B$ bits are loaded, then a second iteration of the above fine tuning process occurs. In this $\Delta B$ case, a new power margin of the sub-channels is computed and stored in yet another array. These are ordered in the same fashion as before, and additional $\Delta B-X$ bits are loaded into sub-channels again based on an ordering of their respective design margins, and subject to their otherwise exceeding the aforementioned design margin threshold. In the event the additional $\Delta B-X$ bits cannot be accommodated, a notification would occur to the host controller 480 and transmitting side of the channel through OPC 418 to reduce the target bit rate, and/or to possibly relax certain system performance constraints, such as the overall error rate or design margin.

The case for $\Delta B<0$

7. If at step 715 $\Delta B<0$, it is necessary to remove $|\Delta B|$ bits to increase overall system performance. In this case, the following variable is calculated at step 730:

$$F_{-1}(i)=(2^{b(i)}-1)/(SNR(i)/\gamma^*_m\gamma_b)$$

This new variable represents the factor by which the constant power margin $\gamma_m$ can be increased while maintaining the same bit and error rate performance for sub-channel i. Therefore, sub-channels that have small $F_{-1}(i)$ or small power margins should thus be selected first for dropping bits to increase their power margin. In other words, overall system performance would increase the most by reducing their capacity first. At step 732, array $\{F_{-1}(i)\}$ 434 is then sorted in ascending order from lowest to highest margins) forming a new array ASORT $\{F_{-1}(i)\}$ 435. Given this sorted sequence, at step 734 a single bit is dropped sequentially for each sub-channel until either $\Delta B$ bits have been dropped or all sub-channel bit loadings have been updated. When dropping bits, as with when adding bits, certain system constraints may need to be observed. For example, in T1E11.413, it is not permissible to have fewer than 2 bits per channel in the proposed ADSL standard, but this limitation may not be present in other environments using the present invention. The routine then proceeds to system performance margin evaluation step 740 which is discussed at step 8 below.

Energy Redistribution Calculations based on System Performance Margin

8. After completing either step 5 or 6 above, the routine then proceeds to step 740, where the actual power margin is computed for each subchannel. For purposes of the following discussion, we use the expression b*(i) to denote the new bit loading for each sub-channel. The required energy loading factor for sub-channel i with respect to the reference energy $E_{ref}$ and previous power margin $\gamma_m$ is:

$$e(i)=([2^{b(i)}-1]*\gamma_m\gamma_b)/SNR(i)$$

9. To meet certain total power constraints, factor e(i) may need to be scaled up or down at step 740. For example, in T1E1.413, the condition given by equation (3) needs to be met. In this case, the actual energy loading factor should be:

$$e*(i)=N_{ch}*e(i)/\Sigma e(i)$$

In other words, the energy loaded for each sub-channel is e*(i) $E_{ref}$.

10. Following this, at step 760, the new power margin is computed as:

$$\gamma_{m,new}=N_{ch}*\gamma_m/\Sigma e(i)$$

11. The routine then exits at step 790 and the new parameters calculated above are used to control Tone Ordering Circuit 320 and other transmit circuitry so as to generate an updated "fine tuned" bit and energy allocation for the sub-channels used in the transmitted signal.

A number of observations can be made about this second fine tuning process embodiment. First, as can be seen from the above, this second embodiment is most practical when only minor variations exist in an achieved data rate (or a desired target rate) or when the SNR of the sub-channels is relatively low. One variation of the present invention, therefore, includes a system that utilizes the initialization process described above, as well as both of the fine tuning processes. Decision logic, which can be suitably designed by any person of ordinary skill based on the teachings herein and the unique aspects of the particular implementation using the present invention, can therefore be implemented such that any particular desired variation in system performance or dynamic adaptation can be routed accordingly to the most appropriate of the fine tuning processes above. In this manner, a flexible fine tuning operation can be customized and optimized for any system.

Secondly, unlike prior art schemes, which typically "load" additional bit requirements primarily based on a consideration of those carriers already having a large performance margin, or based on a difference bit array generated from the rounding effects resulting from the calculations of b(i), the present bit fine tuning process loads new bits based on a prioritization scheme which examines what effect adding a new bit will have on overall system power performance margin. New bits are then loaded in a batch operation to those carriers that show the best margin performance even after reduction in margin caused by such additional loading. From Equation (1), it can be seen that each new bit reduces the sub-channel margin by an amount $\gamma_{+1}=10*Log[(2^{b(i)+1}-1)/(2^{b(i)}-1)]$ in dB. Similarly, it can be seen that each bit removed increases the sub-channel margin by an amount $\gamma_{-1}=10*Log[(2^{b(i)}-1)/(2^{b(i)-1}-1)]$.

In addition, this second embodiment of a fine tuning process is powerful enough that it can be used even with those prior art bit and energy initialization routines that do not initially converge, or that do not converge quickly enough. In other words, the computational burden on prior art routines is minimized, and the initialization process is accelerated (reduced in time), because a hand-off can be made to the present improved bit fine tuning process at a very early stage (i.e., after a defined number of iterations).

In experimental simulations conducted by the applicants, the second embodiment of a bit fine tuning process described above seems to provide a noticeable performance advantage over prior art fine tuning processes, even when the former is used in conjunction with a prior art bit and energy loading initialization process. The bit fine tuning process of the present invention also has a number of additional beneficial characteristics, including substantially reduced computational complexity. This feature allows the fine tuning to proceed in much faster fashion than previously possible, and results again in faster setup and adjustment times. For example, the applicants have discovered that the fine tuning process described immediately can adjust a −22 bit variation in a 1000 bit target symbol rate in roughly a little more than half the time required for a prior art fine tuning process to handle a +17 bit variation. When the number of bits to be fine tuned increases, the advantages of the present process become significantly magnified. At 700 bits/symbol, for example, the pool convergence properties of the prior art initial loading require an addition of 140 bits, and this fine tuning operation takes almost ten times that required by the present second fine tuning process to handle a similar bit variation.

Therefore, in one useful variation of the present system, certain well performing sub-channels may have more than one bit added before other poor performing sub-channels are loaded with even another single bit. In other words, additional bits are added to sub-channels so long as their design margin exceeds a particular threshold, which can be set by the system designer depending on the expected and desired performance of the system.

It will be appreciated also by those skilled in the art that while the inventions of the present disclosure are preferably implemented in the hardware as shown in FIGS. 2–4, other alternative schemes may be used and/or may be preferable for other environments. It should be apparent as well that the program ROM containing the aforementioned bit/loading and bit fine tuning procedures can be implemented as part of a non-volatile storage portion of a stand-alone integrated circuit, or embedded as part of a non-volatile storage structure in an architecture of a typical digital signal processing device. The instructions for carrying out such procedures are encoded or implemented in a silicon substrate as is done with other program ROMs, and using conventional manufacturing techniques. Alternatively, the procedures can be embodied in traditional computer-readable media such as a floppy disk, tape, hard disk, CD-ROM or equivalent non-volatile storage system. In this format, they can be transported easily and loaded via a host computer 480 into RAM 430 through data path 421 where they can be accessed by high speed signal processor 410. In any event, the final implementation is not important, and the only key consideration is that such instructions are accessible to (readable by) the high speed processor so that it operates to effectuate the above procedures. Finally, it is expected that the present process could also be implemented at an even more fundamental hardware level by appropriate microelectronic architectures comprised of conventional high speed logic devices and logic gates, registers, clocking circuits, etc.

It will also be appreciated by those skilled in the art that the above discussion applies to multi-carrier systems in general. For different systems, minor modifications can be performed to meet different restrictions such as the bit allocation range for each QAM sub-channel and output power spectrum range. Also, it is apparent that the present invention would be beneficially used in any high speed multi-carrier applications and environments where other types of VLSI and ULSI components beyond those illustrated in the foregoing descriptions are used. Moreover, the above discussion has been cast in terms of an ADSL embodiment, but the present invention is by no means limited to such embodiments. Other applications may allow different bit and energy allocations outside the restrictions imposed on ADSL systems. For example, in the ADSL standard, no more than +/-256 bits are adjustable in any particular fine tuning pass (i.e., one bit per subchannel), but other xDSL systems may allow for greater target rate expansions, or have different upper and lower bit threshold adjustments during any particular pass. In other cases, it may be necessary to impose some sort of floor level benchmark for the subchannel margin, so that a bit cannot be added to certain subchannels not achieving such margin. Accordingly, it is intended that the all such alterations and modifications be included within the scope and spirit of the invention as defined by the following claims.

What is claimed is:

1. A circuit for use in a high speed multi-channel transmission system, which system is intended to transmit data at a data rate R using N sub-channels, said circuit comprising:
   a sub-channel parameter memory for storing K signal-to-noise values associated with K sub-channels, where K<N; and
   a processing unit for determining and dynamically adapting data capacities of each of the K sub-channels based on an evaluation of the following parameters:
   i) the K signal-to-noise ratios; and
   ii) said data rate R; and
   iii) a number $N_{ch}$ of the K sub-channels having a non-zero bit capacity; and
   wherein the processing unit determines the data capacities in one or more iterations of a routine executed by the processing unit, and $N_{ch}$ is calculated during each iteration.

2. The circuit of claim 1, wherein said processing unit is a signal processor, and further including a microcode routine which is executed by said signal processor to determine the data capacities.

3. The circuit of claim 1, wherein the sub-channel parameter memory also stores minimum ($b_{min}(i)$) and maximum ($b_{max}(i)$) bit loadings for each of the K sub-channels.

4. The circuit of claim 3, wherein the sub-channel parameter memory stores power modification factors $e_{min}(i)$ and $e_{max}(i)$ for each of the K sub-channels.

5. The circuit of claim 4, wherein the processing unit determines $N_{ch}$ based on an evaluation of $b_{min}(i)$, $b_{max}(i)$, $e_{min}(i)$ and $e_{max}(i)$.

6. The circuit of claim 4, wherein $b_{min}(i)$, $b_{max}(i)$, $e_{min}(i)$ and $e_{max}(i)$ are adjusted dynamically as needed to meet specific system constraints.

7. The circuit of claim 1, wherein the processing unit also determines the data capacities based on a consideration of maximum transmission power P for such system.

8. The circuit of claim 7, wherein the processing unit also considers power adjustment values for the sub-channels in determining the data capacities, the power adjustment values corresponding to some function of the following:

$$(e_{max}(i)-e_{min}(i))/(b_{max}(i)-b_{min}(i))$$

where $b_{min}(i)$ and $b_{max}(i)$ are calculated minimum and maximum bit loadings respectively for each of the K sub-channels, and $e_{min}(i)$ and $e_{max}(i)$ are sub-channel power modification factors associated with such minimum and maximum bit loadings.

9. The circuit of claim 8, wherein a value of transmission power to be used in said system is adjusted based on an evaluation of a sorted set of the power values.

10. The circuit of claim 1, wherein the processing unit initializes and adapts the system to achieve said data rate R by generating an interval consisting of two values $\{B_1, B_2\}$ which values bound ($B_1<B<B_2$) a target value B, where $B=R/R_{symbol}$, and where $R_{symbol}$ is a constant.

11. The circuit of claim 10, wherein the two different values $B_1$, $B_2$ are generated based on an estimated value of a power margin ($\gamma_m$) for said system.

12. The circuit of claim 10, wherein a power margin $\gamma_{min}$ is associated with $B_1$, and a second power margin $\gamma_{max}$ is associated with $B_2$, and the processing unit achieves said data rate R based on computing an iterative power margin $\gamma_m = \sqrt{\gamma_{min}} * \sqrt{\gamma_{max}}$.

13. The circuit of claim 1, wherein a bit error rate $\gamma_b$ for each sub-channel can be varied.

14. The circuit of claim 1, wherein the processing unit dynamically adapts the data capacities in response to changes in characteristics of a transmission channel used by the transmission system.

15. The circuit of claim 1, wherein the processing unit dynamically adapts the data capacities in response to changes in target data rate R for the transmission system.

16. A circuit for use in a high speed multi-channel transmission system, which system is intended to transmit data at a target data rate R using K sub-channels, said circuit comprising:
   a sub-channel parameter memory for storing K signal-to-noise values associated with K sub-channels, where K<N; and
   a processing unit for computing rough initial data capacities for each of the K sub-channels during an initialization procedure based on an evaluation of the following parameters:
   i) the K signal-to-noise ratios; and
   ii) said target data rate R; and
   iii) an iteration count M; and
   wherein the processing unit can determine the rough initial data capacities in M or fewer iterations of the initialization routine, and thereafter a fine tuning routine can be executed to determine more optimal capacities for the K sub-channels.

17. The circuit of claim 16, wherein said processing unit is a signal processor, and further wherein the computation of the data capacities is implemented in microcode which is executed by said signal processor.

18. The circuit of claim 16, wherein a setup time for establishing a communications link used by said system can be controlled by varying the iteration criteria count.

19. The circuit of claim 16, wherein a rate R' approximately equal to R is effectuated during the initialization procedure, and said target data rate R is effectuated during the fine tuning procedure.

20. The circuit of claim 16, wherein the processing unit also considers power adjustment values for the sub-channels in determining the rough as well as the optimal data capacities, the power adjustment values being a function of the following:

$$(e_{max}(i)-e_{min}(i))/(b_{max}(i)-b_{min}(i))$$

where $b_{min}(i)$ and $b_{max}(i)$ are related to calculated minimum and maximum bit loadings respectively for each of the K sub-channels, and $e_{min}(i)$ and $e_{max}(i)$ are related to sub-channel power modification factors associated with such minimum and maximum bit loadings.

21. The circuit of claim 16, wherein said target data rate R is achieved by generating interval consisting of two different values $\{B_{min}, B_{max}\}$ during the M or fewer iterations which values bound ($B_{min} < B_{target} < B_{max}$) a symbol data rate $B_{target}$, where $B_{target} = R_{symbol}$, and where $R_{symbol}$ is a constant.

22. The circuit of claim 21, wherein the two different values $B_{min}$, $B_{max}$ are generated based on an estimated value of a power margin ($\gamma_m$) for said system.

23. The circuit of claim 22, wherein a power margin $\gamma_{min}$ is associated with $B_{min}$, and a second power margin $\gamma_{max}$ is associated with $B_{max}$, and the processing unit achieves said target data rate based on computing an iterative power margin $\gamma_m = \sqrt{\gamma_{min}} * \sqrt{\gamma_{max}}$.

24. The circuit of claim 16, wherein a bit error rate $\gamma_b$ for each sub-channel can be varied.

25. The circuit of claim 16, wherein the processing unit can also dynamically adapt the data capacities during the fine tuning procedure in response to changes in characteristics of a transmission channel used by the said transmission system.

26. The circuit of claim 16, wherein the processing unit can dynamically adapt the data capacities during the fine tuning procedure in response to changes in target data rate R for the transmission system.

27. A circuit for use in a high speed multi-channel transmission system, which system is intended to transmit data at a rate R using K sub-channels, said circuit comprising:
- a sub-channel parameter memory for storing signal-to-noise values associated with some or all of said sub-channels; and
- a processing unit which can perform a configuration procedure and an adaptation routine to configure and adapt said system to operate at said rate R; and
- wherein the configuration and adaptation procedures include operations executed by the processing unit in one or more iterations, and during each iteration a sub-channel usability determination is made of which of the K sub-channels should be disabled, such determination being based on a consideration of a calculated minimum ($b_{min}$) and maximum ($b_{max}$) bit capacity of said sub-channels; and
- further wherein the processing unit allocates bit loadings only to the sub-channels which are not disabled during each iteration.

28. The circuit of claim 27, wherein the sub-channel usability determination is based on a consideration of a power modification factor $e_{min}$ associated with $b_{min}$ and a power modification factor $e_{max}$ associated with $b_{max}$, and wherein the power modification factors correspond to an adjustment constant usable for determining a power transmission value for each of the sub-channels.

29. The circuit of claim 28, wherein the processing unit disables those sub-channels which would require, in order to achieve a particular bit capacity, power modifications larger than a predetermined threshold.

30. The circuit of claim 29, wherein the processing unit also disables those sub-channels for which $b_{min}$ and $b_{max}$ are both less than a predetermined value.

31. The circuit of claim 27, wherein the processing unit can dynamically adapt the data capacities in response to changes in characteristics of a transmission channel used by the transmission system.

32. The circuit of claim 27, wherein the processing unit can dynamically adapt the data capacities in response to changes in target data rate R for the transmission system.

33. A circuit for use in a high speed multi-channel transmission system, which system is intended to transmit data at a data rate R using K sub-channels and with an overall target output power value P, said circuit comprising:
- a sub-channel parameter memory for storing signal to noise values associated with some or all of said sub-channels; and
- a processing unit which can perform a configuration procedure and an adaptation procedure to configure and adapt said system to operate at said data rate R; and
- wherein the configuration and adaptation procedures include operations executed by the processing unit in one or more iterations, and during each iteration:
  i) a determination is made of a proposed minimum ($b_{min}$) and a proposed maximum ($b_{max}$) bit loading for the data capacities of sub-channels that are not disabled; and
  ii) a determination is made of an output power value P' associated with such proposed loading; and
  iii) if P'>P, bit capacity is removed in sorted order from those sub-channels which have the greatest power differential associated with carrying either $b_{min}$ or $b_{max}$ until P' is substantially equal to P.

34. The circuit of claim 33, further wherein during each iteration an achieved data rate R' is calculated and compared to R, and the procedure is executed until R' is substantially equal to R and P' is substantially equal to P.

35. The circuit of claim 34, wherein during each iteration if R'≠R, an adjustment is made to system power margin ($\gamma_m$) so that in later iterations R' will converge to R.

36. The circuit of claim 35, wherein during each iteration, a number $N_{ch}$ of non-disabled sub-channels is calculated and used for determining P'.

37. The circuit of claim 33, wherein said processing unit is a signal processor, and further wherein the configuration and adaptation procedures are microcode routines which are executed by said signal processor to determine the optimal data capacities.

38. A circuit for use in a high speed multi-channel transmission system, which system is intended to transmit data using K sub-channels, a total transmission power P, and a power margin $\gamma_m$, said circuit comprising:
- a sub-channel parameter memory for storing data capacities associated with some or all of said sub-channels; and
- a processing unit which can perform a configuration procedure and an adaptation procedure to configure optimal data capacities; and
- wherein the procedures include operations executed by the processing unit to compute a transmission rate $B_{total}$ based on the following:

i) a determination of a proposed minimum ($b_{min}$) and a proposed maximum ($b_{max}$) bit loading for the data capacities of sub-channels that are not disabled; and ii) a determination of an output power value P' and power modification factors, $e_{max}$ and $e_{min}$ associated with such bit loadings; and iii) replacing $b_{max}$ with $b_{min}$, and $e_{max}$ with $e_{min}$, for one or more sub-channels, until $P' \leq P$;

whereby $B_{total} = \Sigma b_{max}$ for all the sub-channels, and is maximized for such values of P and $\gamma_m$.

39. The circuit of claim 38, wherein the operation of replacing $b_{max}$ with $b_{min}$ and $e_{max}$ with $e_{min}$ is done in descending order according to a sorting of the sub-channels based on a function related to the following for each sub-channel $(e_{max} - e_{min})/(b_{max} - b_{min})$.

40. The circuit of claim 38, wherein $B_{total}$ can be adjusted to achieve a different rate $B_{target}$ by estimating an adjustment $\Delta\gamma_m$ to said system performance margin $\gamma_m$.

41. The circuit of claim 38, wherein a target rate $B_{target}$ can be achieved by the processing unit by computing two values of $B_{total}$, namely, $B_{min}$ and $B_{max}$, which bound $B_{target}$ ($B_{min} < B_{target} < B_{max}$) and by the processing unit also computing a new $B_{total}$ based on a system performance margin $\gamma_m'$ which is a function of $\gamma_{min}$ and $\gamma_{max}$, where $\gamma_{min}$ and $\gamma_{max}$ are performance margins associated with $B_{min}$ and $B_{max}$ respectively.

42. The circuit of claim 41 wherein $\gamma_m' = \sqrt{\gamma_{min}} * \sqrt{\gamma_{max}}$ and $\gamma_m'$ is iteratively computed until $B_{total}$ converges to $B_{target}$.

43. The circuit of claim 38, wherein during the procedures, a number $N_{ch}$ of non-disabled sub-channels is calculated.

44. The circuit of claim 38, wherein said processing unit is a signal processor, and further wherein the procedures are microcode routines which are executed by said signal processor to determine the optimal data capacities.

45. The circuit of claim 38, wherein a bit error rate $\gamma_b$ for each sub-channel can be varied.

46. The circuit of claim 38, wherein the processing unit dynamically adapts the data capacities in response to changes in characteristics of a transmission channel used by said transmission system.

47. The circuit of claim 38 wherein the processing unit dynamically adapts the data capacities in response to changes in target data rate R for said transmission system.

* * * * *